(12) United States Patent
Kato

(10) Patent No.: US 9,421,882 B2
(45) Date of Patent: Aug. 23, 2016

(54) TRACTION CONTROL DEVICE AND TRACTION CONTROL METHOD

(71) Applicant: PIONEER CORPORATION, Kanagawa (JP)

(72) Inventor: Masahiro Kato, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/781,680

(22) PCT Filed: Apr. 1, 2013

(86) PCT No.: PCT/JP2013/059918
§ 371 (c)(1),
(2) Date: Oct. 1, 2015

(87) PCT Pub. No.: WO2014/162443
PCT Pub. Date: Oct. 9, 2014

(65) Prior Publication Data
US 2016/0039311 A1    Feb. 11, 2016

(51) Int. Cl.
*B60L 15/20* (2006.01)
*B60L 3/00* (2006.01)
(Continued)

(52) U.S. Cl.
CPC .............. *B60L 15/20* (2013.01); *B60L 3/0076* (2013.01); *B60L 3/108* (2013.01); *B60L 3/12* (2013.01);
(Continued)

(58) Field of Classification Search
CPC ................................ B60L 15/20; B60L 3/106
See application file for complete search history.

(56) References Cited

U.S. PATENT DOCUMENTS 7,452,306 B2 * 11/2008 Casey .................. B60K 17/356
180/197
7,779,947 B2 * 8/2010 Stratton .................. B60T 8/175
180/197
(Continued)

FOREIGN PATENT DOCUMENTS

JP    07-231516    8/1995
JP    2006-034012  2/2006
(Continued)

OTHER PUBLICATIONS

International Search Report PCT/JP2013/059918 dated Jul. 2, 2013.
(Continued)

*Primary Examiner* — Thomas Tarcza
*Assistant Examiner* — Alex C Dunn
(74) *Attorney, Agent, or Firm* — Young & Thompson

(57) ABSTRACT

The speed v of a motor driven body, the rotational speed ω and the actual torque value $T_m$ generated by the motor are acquired. Subsequently, unit (741) estimates the slip rate X of the drive wheels based on the movement speed v and the rotation speed ω. Further, unit (742) estimates the drive torque $T_d$ based on the rotational speed w and the actual torque value $T_m$. Next, unit (743) calculates a limit value L for a torque command value $T_c$ based on the slip rate X and the drive torque $T_d$. Further, unit (744) limits the torque command value $T_c$ using the limit value L, generates a torque setting value $T_s$, which is sent to a motor drive system (900). As a result, it is possible to quickly realize control in accordance with changes in the road surface state, thus allowing safe travel while ensuring the needed drive power.

8 Claims, 19 Drawing Sheets

(51) Int. Cl.
*B60L 7/14* (2006.01)
*B60L 11/18* (2006.01)
*B60L 15/02* (2006.01)
*B60L 3/10* (2006.01)
*B60L 7/26* (2006.01)
*B60L 3/12* (2006.01)

(52) U.S. Cl.
CPC ... *B60L 7/14* (2013.01); *B60L 7/26* (2013.01); *B60L 11/1803* (2013.01); *B60L 15/025* (2013.01); *B60L 15/2009* (2013.01); *B60L 2210/40* (2013.01); *B60L 2240/12* (2013.01); *B60L 2240/14* (2013.01); *B60L 2240/24* (2013.01); *B60L 2240/26* (2013.01); *B60L 2240/421* (2013.01); *B60L 2240/423* (2013.01); *B60L 2240/427* (2013.01); *B60L 2240/429* (2013.01); *B60L 2240/461* (2013.01); *B60L 2240/463* (2013.01); *B60L 2240/465* (2013.01); *B60L 2240/527* (2013.01); *B60L 2240/529* (2013.01); *B60L 2240/64* (2013.01); *B60L 2240/647* (2013.01); *B60L 2240/80* (2013.01); *B60L 2250/26* (2013.01); *B60L 2260/26* (2013.01); *B60L 2260/28* (2013.01); *B60L 2260/44* (2013.01); *Y02T 10/643* (2013.01); *Y02T 10/7005* (2013.01); *Y02T 10/7241* (2013.01); *Y02T 10/7275* (2013.01); *Y02T 10/7291* (2013.01); *Y02T 90/16* (2013.01)

(56) References Cited

U.S. PATENT DOCUMENTS

| | | | | |
|---|---|---|---|---|
| 8,886,381 | B2* | 11/2014 | Ozaki | B60L 15/20 180/65.1 |
| 9,145,287 | B2* | 9/2015 | Makino | B60K 7/0007 |
| 2003/0167116 | A1* | 9/2003 | Erban | B60T 8/172 701/74 |
| 2007/0275819 | A1* | 11/2007 | Hirata | B60K 6/365 477/5 |
| 2009/0101428 | A1* | 4/2009 | Itoh | B60T 8/175 180/197 |
| 2012/0089309 | A1* | 4/2012 | Kim | B60W 10/06 701/58 |
| 2013/0158804 | A1* | 6/2013 | Callaway | B60T 8/175 701/41 |
| 2013/0345917 | A1* | 12/2013 | Ozaki | B60L 15/20 701/22 |

FOREIGN PATENT DOCUMENTS

| | | |
|---|---|---|
| JP | 2007-336679 | 12/2007 |
| JP | 2008-062687 | 3/2008 |
| JP | 2008-113541 | 5/2008 |
| JP | 2008-167624 | 7/2008 |
| JP | 2012-186928 | 9/2012 |
| WO | 2012121198 | 9/2012 |

OTHER PUBLICATIONS

Written Opinion PCT/JP2013/059918 dated Jul. 2, 2013.

\* cited by examiner

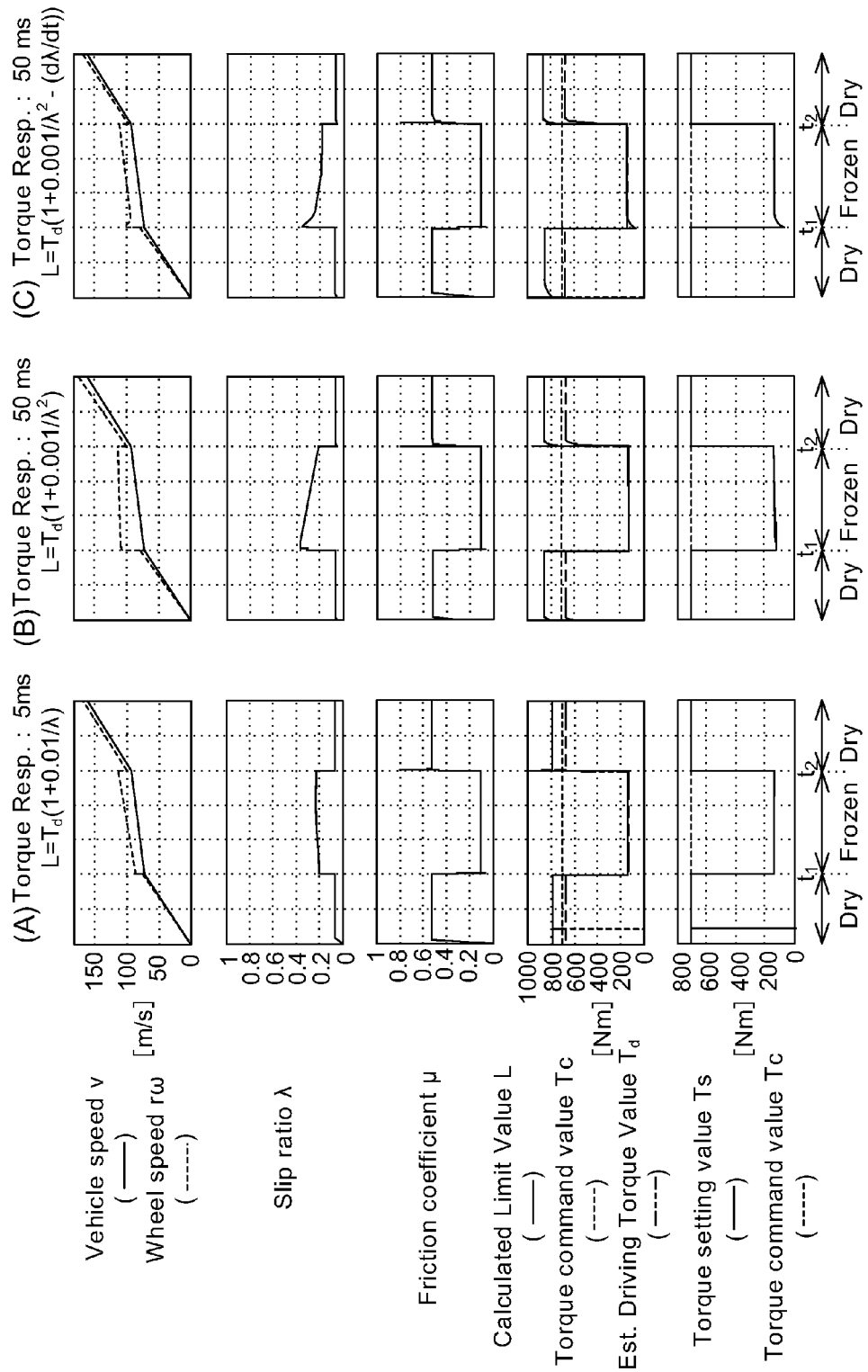

TRACTION CONTROL DEVICE AND TRACTION CONTROL METHOD

TECHNICAL FIELD

The present invention relates to a traction control device, to a traction control method and to a traction control program, and to a recording medium upon which that traction control program is recorded.

BACKGROUND ART

In recent years, from the standpoint of the burden upon the environment and so on, attention is being directed to electric automobiles of types that perform driving and braking with an electric motor according to the amount that an accelerator pedal or a brake pedal is stepped upon. Here, since the electric motor is an electrical component, accordingly the responsiveness and the linearity of driving and of braking for such an electric automobile are outstandingly excellent, as compared to those of an automobile equipped with an internal combustion engine for performing driving and braking by using both of the engine and a hydraulic braking mechanism.

This is because the response speed of an electric motor is around ten times faster than that of a hydraulic mechanism, and is around a hundred times faster than that of an internal combustion engine. Moreover, the relationship between the actual torque value $T_m$ generated by an electric motor and the value $I_m$ of the current to the motor (hereinafter also sometimes termed the "drive current value") is given by the following Equation (1):

$$T_m = K_t \cdot I_m \tag{1}$$

Here, the torque constant $K_t$ may be obtained in advance by measurement. Note that, depending on the type of the motor, the torque constant $K_t$ may be fixed or variable according to the motor current value $I_m$ or according to the rotational speed. Therefore, the actual torque value $T_m$ is accurately ascertained by detecting the motor current value $I_m$ with a current sensor or the like during the operation of the electric motor. Moreover, the actual torque value $T_m$ is easily controlled by controlling the motor current value $I_m$. Due to this, techniques of various types have been proposed for an electric automobile in order to implement traction control whose levels of safety and of comfort are high as compared to that of an internal combustion engine or via control of brake hydraulic pressure.

As the first example of such a proposed technique, there is mentioned the technique for detecting the slip ratio $\lambda$ and the friction coefficient $\mu$ during vehicle travel, and for controlling the range over which the driving torque of the electric motor increases and decreases on the basis of the slip ratio $\lambda$ and the friction coefficient $\mu$ that have thus been detected (refer to Patent Document #1, hereinafter termed the "prior art 1"). With the technique of the prior art 1, the state of the road surface upon which the vehicle is traveling is ascertained by calculating the average value of the ratio of the friction coefficient $\mu$ to the slip ratio $\lambda$. And the increase or decrease of the driving torque is restricted, when the road surface is one upon which slippage can easily occur.

As the second example of the proposed technique, there is mentioned the technique to restrict the requested torque by performing (i) to obtain the slip ratio $\lambda$ and the friction coefficient $\mu$ during traveling by calculation; and (ii) to calculate a maximal driving torque on the basis of the maximal friction coefficient as estimated from the slip ratios $\lambda$ and the coefficients of friction $\mu$ thus calculated (refer to Patent Document #2, hereinafter termed the "prior art 2"). With the technique of the prior art 2, the maximal friction coefficient is estimated by selecting a $\mu$-$\lambda$ characteristic curve for the road surface upon which the vehicle is traveling on the basis of the correlation between the slip ratios $\lambda$ and the friction coefficients $\mu$ that have been calculated up until the present time point.

As the third example of a proposed technique, there is mentioned the technique for restricting the driving torque on the basis of the permitted maximal torque derived by performing: (i) estimation of the slip ratio $\lambda$ and the driving torque T during traveling; (ii) estimation of the friction coefficient $\mu$ on the basis of this slip ratio $\lambda$ and this driving torque T that have thus been estimated; and (iii) derivation of a permitted maximal torque for this friction coefficient $\mu$ that has thus been estimated and for the current load in the vertical direction sequentially (refer to Patent Document #3, hereinafter termed as the "prior art 3"). With the technique of the prior art 3, the permitted maximal torque is obtained by estimating the friction coefficient $\mu$ by referring to the first table that gives the relationship between the slip ratio $\lambda$ and the driving torque T, and the friction coefficient $\mu$, and by also referring to the second table that gives the relationship between the friction coefficient $\mu$ and the permitted maximal torque for each value of the load in the vertical direction.

PRIOR ART DOCUMENTS

Patent Documents

Patent Document #1: Japanese Laid-Open Patent Publication 2006-034012

Patent Document #2: Japanese Laid-Open Patent Publication 2008-167624

Patent Document #3: Japanese Laid-Open Patent Publication 2012-186928

SUMMARY OF THE INVENTION

Problems to be Solved by the Invention

The motion of each of the driving wheels of a vehicle that is traveling upon a road surface can be expressed in terms of a single wheel model (hereinafter, also sometimes termed a "driving wheel model"). The variables in the driving wheel model are shown in FIG. 1. In FIG. 1, "M" is the weight of the moving body, "$F_d$" is the driving force of the driving wheel WH, and "$F_{dr}$" is the traveling resistance. Moreover, "$T_m$" is the actual torque value that is generated by the motor and that is applied to the driving wheel WH, "v" is the speed at which the moving body MV is moving (hereinafter, termed the "speed of the vehicle" or the "vehicle speed"), and "$\omega$" is the rotational speed of the driving wheel WH. Furthermore, "N" is the normal reaction force acting upon the driving wheel WH, and "r" is the radius of the driving wheel WH.

In the driving wheel model shown in FIG. 1, the equation of motion of the moving body MV is given by the following Equation (2):

$$M \cdot (dv/dt) = F_d - F_{dr} \tag{2}$$

Moreover, if the moment of inertia of the driving wheel WH is termed "$J_W$" and the driving torque is termed "$T_d$", then the equation of motion of the driving wheel WH is given by the following Equation (3):

$$J_W \cdot (d\omega/dt) = T_m - r \cdot F_d = K_t \cdot I_m - T_d \tag{3}$$

If the friction coefficient of the driving wheel WH upon the road surface is termed μ, then the relationship between the driving force $F_d$ and the normal reaction force N is given by the following Equation (4):

$$\mu = F_d/N \quad (4)$$

Furthermore, in the driving wheel model described above, the slip ratio λ is given by the following Equation (5):

$$\lambda = (r \cdot \omega - v)/\text{Max}(r \cdot \omega, v) \quad (5)$$

Here Max(r·ω, v) means that one of r·ω and v whose numerical value is the greater. During driving, Max(r·ω, v)=r·ω, because (r·ω) is greater than v. In contrast, during braking, Max(r·ω, v)=v, because v is greater than (r·ω).

In the driving wheel model, the relationship between the friction coefficient μ and the slip ratio λ (in other words, the μ-λ characteristic) during driving is generally as shown in FIG. 2, and moreover during braking is as shown in FIG. 3. Note that, in FIGS. 2 and 3, the μ-λ characteristic upon a dry road surface is shown by the solid line, that upon a wet road surface is shown by the single dashed broken line, and that upon a frozen road surface is shown by the double dashed broken line.

Moreover it should be understood that, in the changes of the friction coefficient μ along with increase of the slip ratio during driving shown in FIG. 2, the moving body MV can travel in a stable manner, when the slip ratio is less than or equal to the slip ratio at which the friction coefficient μ becomes maximal (hereinafter, this will be termed a "stable state"). In contrast, the phenomenon of free spinning or the phenomenon of locking of the driving wheel WH can occur, when the slip ratio is greater than the slip ratio at which the friction coefficient μ becomes maximal (hereinafter, this will be termed an "unstable state"). In the following, the region in which the state is stable will be termed the "stable region", while the region in which the state is unstable will be termed the "unstable region".

Furthermore, in the changes of the friction coefficient μ along with increase of the slip ratio during braking shown in FIG. 3, the stable state is that the slip ratio is greater than or equal to the slip ratio at which the friction coefficient μ becomes minimal. In contrast, the unstable state is that the slip ratio is less than the slip ratio at which the friction coefficient μ becomes minimal.

Cases will now be considered in which, with a road surface having such types of μ-λ characteristics, some vehicle progresses from a dry road surface to a frozen road surface and then back to a dry road surface. In that case, the simulation results when a torque command value $T_c$ that corresponds to the amount by which the accelerator pedal is stepped upon is inputted just as is, to the motor drive system as a torque setting value $T_s$ are shown in FIGS. 4 and 5. The FIGS. 4 and 5 show the simulation results of the vehicle speed v, the wheel speed (r·ω), the slip ratio λ, and the friction coefficient μ.

Note that the conditions employed for the above simulations were that: the electric automobile was a four wheel drive vehicle; its weight was 1800 [kg]; the moment of inertia of the driving wheel WH was 1.2 [kg·m²]; and the torque response of the motor was 5 [ms] (the case of an in-wheel motor was assumed). Moreover, the simulations were performed under the assumption that the road surface changed from dry to frozen at the time point $t_1$, and changed back from frozen to dry at the time point $t_2$ ($>t_1$).

As shown overall in FIGS. 4 and 5, when the torque command value $T_c$ is used as the torque setting value $T_s$ just as is, then the slip ratio λ upon the frozen road surface becomes greater along with increase of the torque setting value $T_s$ (=$T_c$). And, when the torque setting value $T_s$ (=$T_c$) becomes greater than a specific value, then the slip ratio λ increases. When the torque setting value $T_s$ becomes 0.2 or greater, the system enters the unstable region shown in FIG. 2 described above. This shows that, since the friction coefficient μ is small on a frozen road surface, accordingly the gripping force is also low, and the system enters the unstable region, when the torque setting value $T_s$ undesirably reaches a level that exceeds this gripping force.

In order to avoid occurrence of such situation in which the system undesirably enters into the unstable region, a method may be contemplated of limiting the torque setting value $T_s$ by performing some type of limitation processing upon the torque command value $T_c$. Methods of this type are employed in the techniques of the entire prior arts 1 to 3. In other words, the techniques of the entire prior arts 1 to 3 are methods in which the torque setting value $T_s$ upon a frozen road surface is limited by controlling the torque setting value $T_s$ be variable according to the estimation result of the state of the road surface, i.e. the λ-μ characteristic, while upon a dry road surface the torque setting value $T_s$ is not limited more than necessary.

However, with the techniques of the prior arts 1 through 3, in order to estimate the λ-μ characteristic, averaging processing is performed (in the prior art 1), or estimation processing by the least-square method is performed (in the prior art 2), or table matching processing is performed (in the prior art 3). Therefore, it is necessary to employ a plurality type of data, accordingly a time period of at least around several seconds is required until appropriate limitation is imposed upon the torque setting value $T_s$. Due to this, it is impossible to impose appropriate limitation upon the torque setting value $T_s$ rapidly, when the state of the road surface has changed. As a result, it is difficult to say that it enables to ensure safety rapidly, when a change from a dry road surface to a frozen road surface occurs abruptly, or to operate according to the intentions by the driver to be executed, when a change from a frozen road surface to a dry road surface occurs abruptly.

Due to this, there is a requirement for techniques that can rapidly apply an appropriate limitation to the torque setting value $T_s$, when the state of the road surface has changed. One of the problems to be solved is to respond to this requirement.

The present invention has been conceived in consideration of the circumstances described above, and its object is to provide a traction control device and a traction control method that, according to change of the state of the road surface, are capable of rapidly implementing control for stable traveling while still ensuring the required drive power.

Means for Solving the Problems

When viewed from a first standpoint, the present invention is a traction control device for a moving body having a driving wheel that is driven by a motor, the traction control device comprising: a movement speed acquisition part acquiring a movement speed of said moving body; a rotational speed acquisition part acquiring a rotational speed of said driving wheel; an actual torque value acquisition part acquiring an actual torque value generated by said motor; and a control part performing limitation control of an operation of said motor, wherein said control part comprises: a slip ratio estimation part estimating the slip ratio of said driving wheel on the basis of said movement speed and said rotational speed; a driving torque estimation part estimating the driving torque of said driving wheel on the basis of a value that is obtained by subtracting a value that is the product of the value of the differential coefficient of said rotational speed and the value of the moment of inertia of said driving wheel, from said actual torque value; a limit value calculation part calculating a limit value for the torque setting value on the basis of said estimated slip ratio and said estimated driving torque; and a limiter part limiting the torque setting value on the basis of said calculated limit value, and said limit value calculation part calculates the limit value so that, the smaller the estimated slip ration is, the larger difference from the estimated driving torque becomes, and the larger the estimated slip ration is, the smaller difference from the estimated driving torque becomes.

And, when viewed from a second standpoint, the present invention is a traction control method that is used by a traction control device for a moving body having a driving wheel that is driven by a motor, comprising the steps of: acquiring a movement speed of said moving body, a rotational speed of said driving wheel, and an actual torque value generated by said motor; and performing limitation control of an operation of said motor, wherein said performing limitation control step comprises: estimating the slip ratio of said driving wheel on the basis of said movement speed and said rotational speed; estimating the driving torque of said driving wheel on the basis of a value that is obtained by subtracting a value that is the product of the value of the differential coefficient of said rotational speed and the value of the moment of inertia of said driving wheel, from said actual torque value; calculating a limit value for the torque setting value on the basis of said estimated slip ratio and said estimated driving torque; and limiting the torque setting value on the basis of said calculated limit value, and in calculating the limit value step, said limit value calculation part calculates the limit value so that, the smaller the estimated slip ratio is, the larger difference from the estimated driving torque becomes, and the larger the estimated slip ration is, the smaller difference from the estimated driving torque becomes.

Furthermore, when viewed from a third standpoint, the present invention is a non-transient computer readable medium having recorded therein a traction control program that, when executed, causes a calculation part to execute the traction control method according the present invention.

BRIEF DESCRIPTION OF THE DRAWINGS

FIG. 22 is a figure showing results of simulation during traction control by the second modified example of limit value calculation, along with a comparison example.

Note that the term "Est." in FIGS. 14 through 19 and 22 means "Estimated".

Moreover, note that the term "Torque Resp." in FIGS. 18, 19, and 22 means "Torque Response Time".

REFERENCE SIGNS LIST

Figure 1:
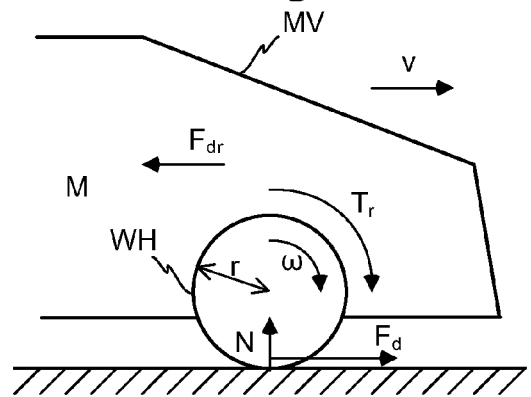
FIG. 1 is a figure showing variables in a driving wheel model.

| REFERENCE SIGNS LIST | |
| --- | --- |
| 100 | traction control device |
| 110 | control unit (movement speed acquisition part, rotational speed acquisition part, actual torque value acquisition part, and control part) |
| 700 | traction control device |
| 710 | movement speed acquisition part |
| 720 | rotational speed acquisition part |
| 730 | actual torque value acquisition part |
| 740 | control part |
| 741 | slip ratio estimation part |
| 742 | driving torque estimation part |
| 743 | limit value calculation part |
| 744 | limiter part |

EMBODIMENT FOR CARRYING OUT THE INVENTION

In the following, an embodiment of the present invention will be explained with reference to FIGS. 6 and 7. Note that, in the following explanation and in the drawings, the same reference symbols are appended to elements that are the same or equivalent, and duplicated explanation is omitted.

[Configuration]

Figure 6:
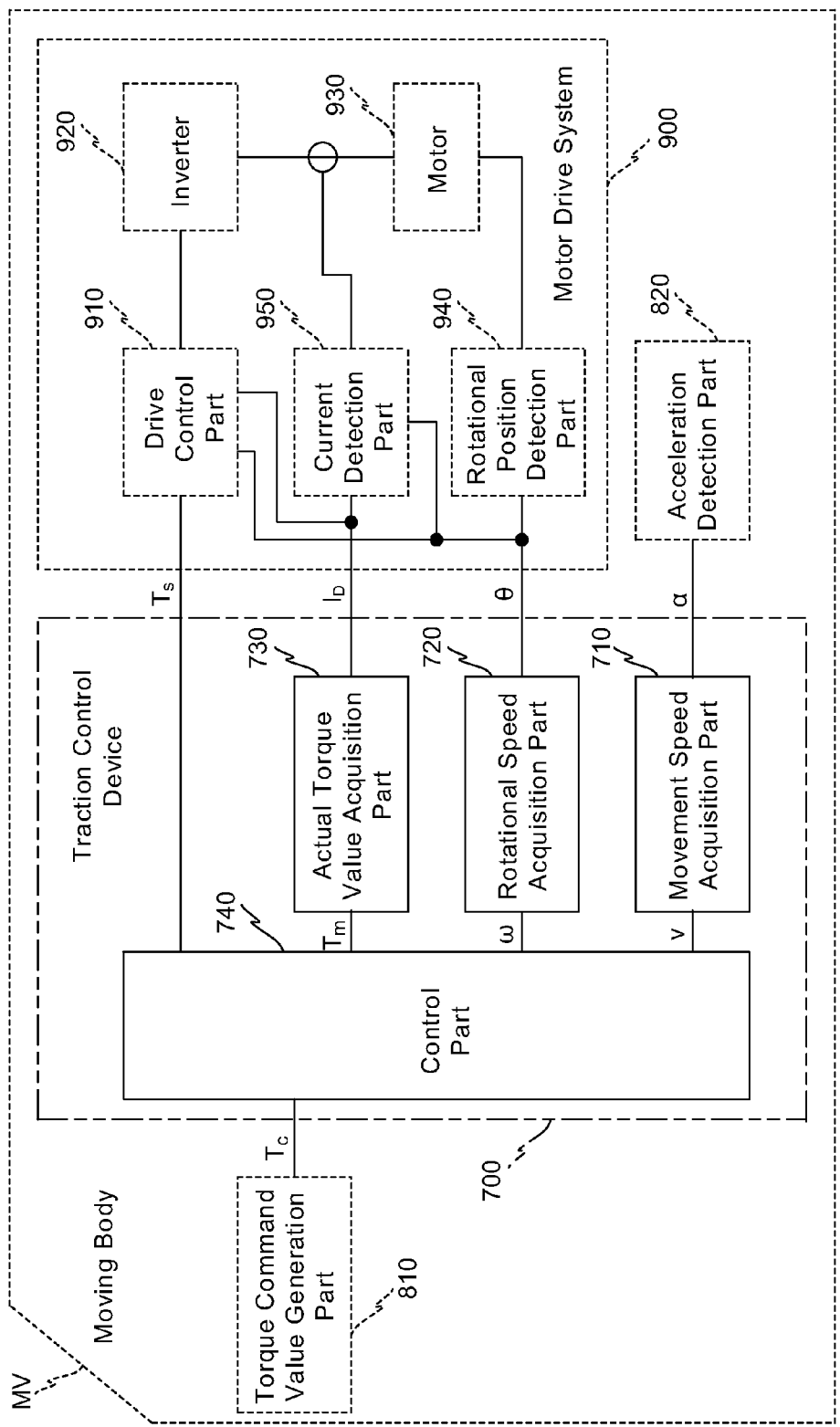
FIG. 6 is a schematic block diagram showing the configuration of a traction control device according to an embodiment of the present invention.

The placement and the configuration of a traction control device 700 according to an embodiment are shown in FIG. 6 as a block diagram.

<Placement of the Traction Control Device 700>

As shown in FIG. 6, the traction control device 700 is arranged within the moving body MV. In addition to this traction control device 700, a torque command value generation part 810, an acceleration detection part 820, and a motor drive system 900 are provided within this moving body MV, and these parts are connected to the traction control device 700.

The torque command value generation part 810 generates a torque command value $T_c$ on the basis of results detected by an accelerator opening amount sensor, a braking amount sensor, a steering angle sensor and so on not shown in the figures, these results being employed in generation of the torque command value $T_c$. The torque command value $T_c$ that has been generated in this manner is sent to the traction control device 700.

The acceleration detection part 820 detects acceleration of the moving body MV in the direction of traveling. The acceleration $\alpha$ that has been detected in this manner is sent to the traction control device 700.

The motor drive system 900 comprises a drive control part 910, an inverter 920, and a motor 930. Moreover, the motor drive system 900 comprises a rotational position detection part 940 and a current detection part 950.

The drive control part 910 receives the torque setting value $T_s$ sent from the traction control device 700. And the drive control part 910 calculates a drive voltage on the basis of the torque setting value $T_s$, the rotational position $\theta$ detected by the rotational position detection part 940, and the detected current value $I_D$ detected by the current detection part 950. For example, if the motor 930 is a three phase motor, then the drive control part 910 calculates a three-phase voltage as the drive voltage. The drive voltage that has been calculated in this manner is sent to the inverter 920.

The inverter 920 receives the drive voltage sent from the drive control part 910. And the inverter 920 supplies current corresponding to the drive voltage to the motor 930. As a result, the motor 930 performs rotational motion on the basis of the torque setting value $T_s$, and rotates the driving wheel.

The rotational position detection part 940 includes a resolver or an encoder. The rotational position detection part 940 detects the rotational position $\theta$ of the motor 930. And the rotational position $\theta$ that has been detected in this manner is sent to the traction control device 700, to the drive control part 910, and to the current detection part 950.

And the current detection part 950 detects the value of one or more currents flowing to the motor 930. For example, if the motor 930 is a three-phase motor, then the current detection part 950 detects the values of at least two among the three phase currents flowing to the motor 930. The current value that has been detected in this manner is sent as a detected current value $I_D$ to the traction control device 700 and to the drive control part 910.

<Configuration of the Traction Control Device 700>

The traction control device 700 comprises a movement speed acquisition part 710, a rotational speed acquisition part 720, an actual torque value acquisition part 730, and a control part 740.

The movement speed acquisition part 710 receives the acceleration $\alpha$ sent from the acceleration detection part 820. And the movement speed acquisition part 710 performs time integration of the acceleration $\alpha$, and thereby acquires the speed of movement v. The movement speed v that has been acquired in this manner is sent to the control part 740.

The rotational speed acquisition part 720 receives the rotational position $\theta$ sent from the rotational position detection part 940. And the rotational speed acquisition part 720 performs time differentiation of the rotational position $\theta$, and thereby acquires the rotational speed $\omega$. The rotational speed $\omega$ that has been acquired in this manner is sent to the control part 740.

The actual torque value acquisition part 730 receives the detected current value $I_D$ sent from the current detection part 950. Subsequently, the actual torque acquisition part 730 calculates the motor current value $I_m$ on the basis of this detected current value $I_D$. Note that the motor current value $I_m$ gives the absolute magnitude of the detected current value $I_D$, in other words $I_m = |I_D|$.

Next, by calculating the actual torque value $T_m$ by employing Equation (1) given above, the actual torque value acquisition part 730 acquires the actual torque value $T_m$. The actual torque value $T_m$ that has been acquired in this manner is sent to the control part 740.

The control part 740 receives the torque command value $T_c$ sent from the torque command value generation part 810. Subsequently, the control part 740 performs limitation control upon the torque command value $T_c$ on the basis of the movement speed v, the rotational speed $\omega$, and the actual torque value $T_m$, and thereby calculates the torque setting value $T_s$. And the control part 740 sends the torque setting value $T_s$ that has thus been calculated to the drive control part 910.

Figure 7:
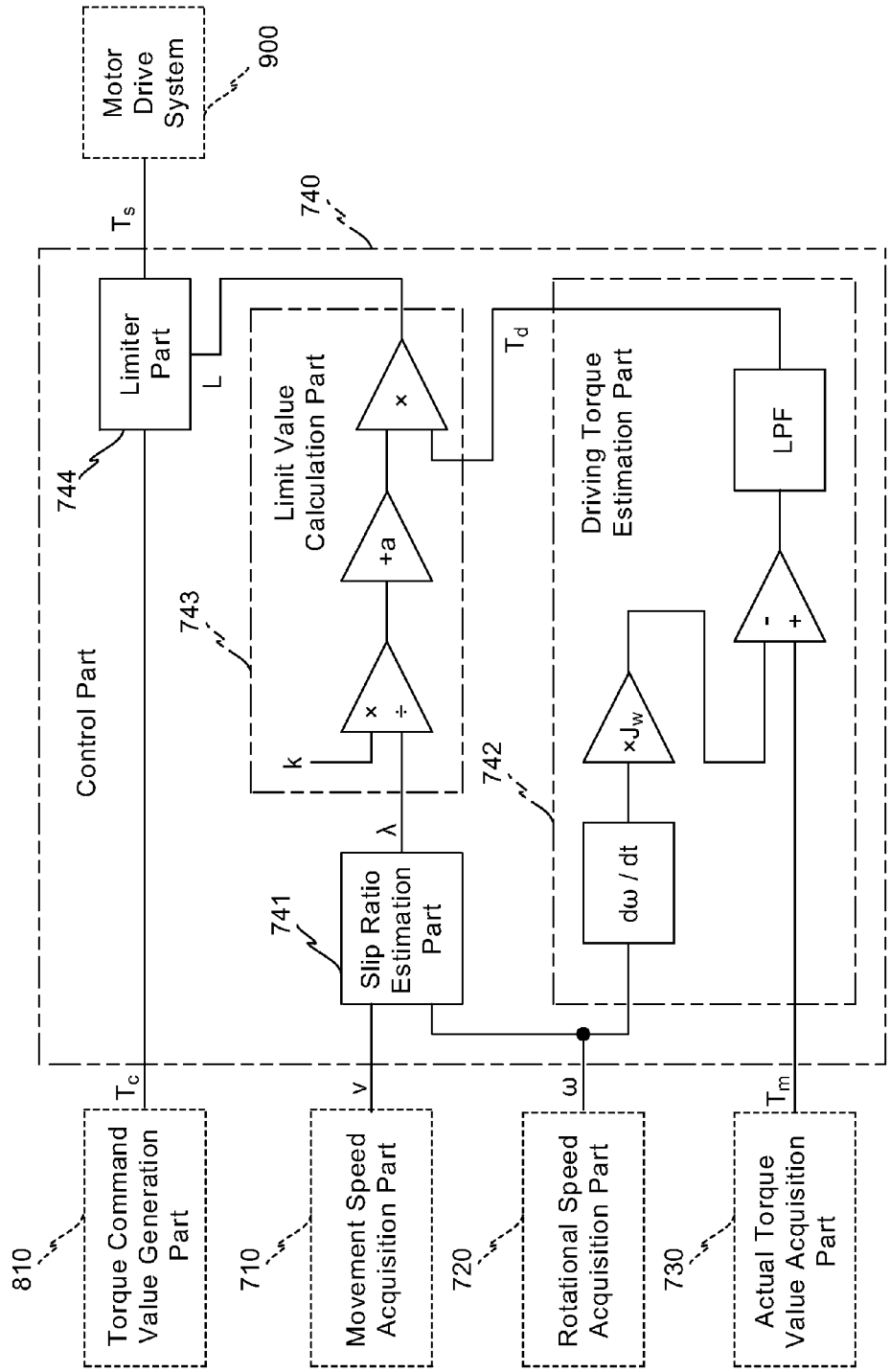
FIG. 7 is a block diagram showing the configuration of a control part in the device of FIG. 6.

As shown in FIG. 7, the control part 740 having the function described above comprises a slip ratio estimation part 741 and a driving torque estimation part 742. Moreover, the control part 740 comprises a limit value calculation part 743 and a limiter part 744.

The slip ratio estimation part receives the movement speed v sent from the movement speed acquisition part 710 and the rotational speed $\omega$ sent from the rotational speed acquisition part 720. And the slip ratio estimation part 741 performs estimation of the slip ratio by calculating the slip ratio $\lambda$ according to Equation (5) above. The slip ratio $\lambda$ that has been calculated in this manner is sent to the limit value calculation part 743.

The driving torque estimation part 742 receives the rotational speed $\omega$ sent from the rotational speed acquisition part 720 and the actual torque value $T_m$ sent from the actual torque value acquisition part 730. Subsequently, the driving torque estimation part 742 performs estimation of the driving torque $T_d$ by passing the value obtained according to the following Equation (6), which is obtained by modifying Equation (3) above, through a low pass filter (i.e. an LPF), and thereby calculates the driving torque $T_d$.

$$T_d = T_m - J_w \cdot (d\omega/dt) \qquad (6)$$

The driving torque $T_d$ that has been estimated in this manner is sent to the limit value calculation part 743.

The limit value calculation part 743 receives the slip ratio $\lambda$ sent from the slip ratio estimation part 741 and the driving torque $T_d$ sent from the driving torque estimation part 742. And the limit value calculation part 743 calculates a limit value L on the basis of the slip ratio $\lambda$ and the driving torque $T_d$. The limit value L that has been calculated in this manner is sent to the limiter part 744.

Note that, in this embodiment, the limit value L is calculated according to the following Equation (7):

$$L = T_d \cdot (a + k/\lambda) \qquad (7)$$

Here, the constant a and the limiter coefficient k are determined in advance by experiment, simulation, and so on, from the standpoint of performing appropriate traction control.

The limiter part 744 receives the torque command value $T_c$ sent from the torque command value generation part 810. And the limiter part 744 performs limitation control upon the torque command value $T_c$ according to the limit value L sent from the limit value calculation part 743, and thus calculates the torque setting value $T_s$.

During the limitation control, if the torque command value $T_c$ is less than or equal to the limit value L, then the limiter part 744 takes the torque command value $T_c$ as being the torque setting value $T_s$. However, if the torque command value $T_c$ is greater than the limit value L, then the limiter part 744 takes the limit value L as being the torque setting value $T_s$. The torque setting value $T_s$ that has been calculated in this manner is sent to the motor drive system 900 (in more detail, to the drive control part 910).

Now, the relationship between the phenomenon of slipping of the moving body and the driving torque will be investigated.

Figure 2:
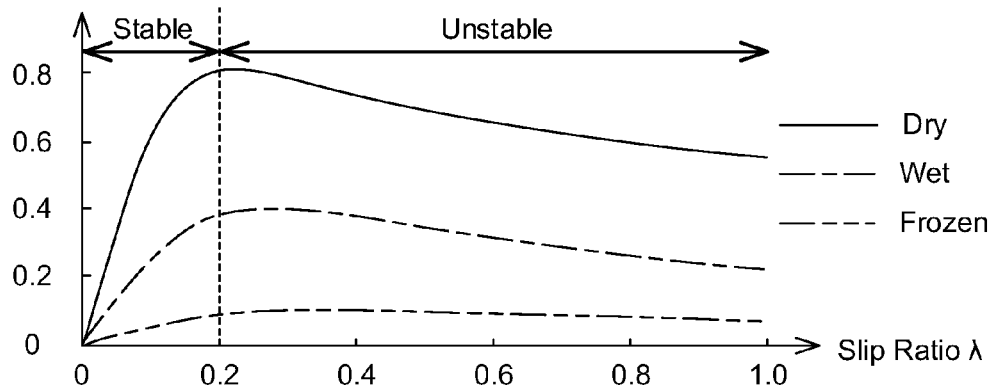
FIG. 2 is a figure showing the relationship between the slip ratio and the friction coefficient during driving.
Figure 3:
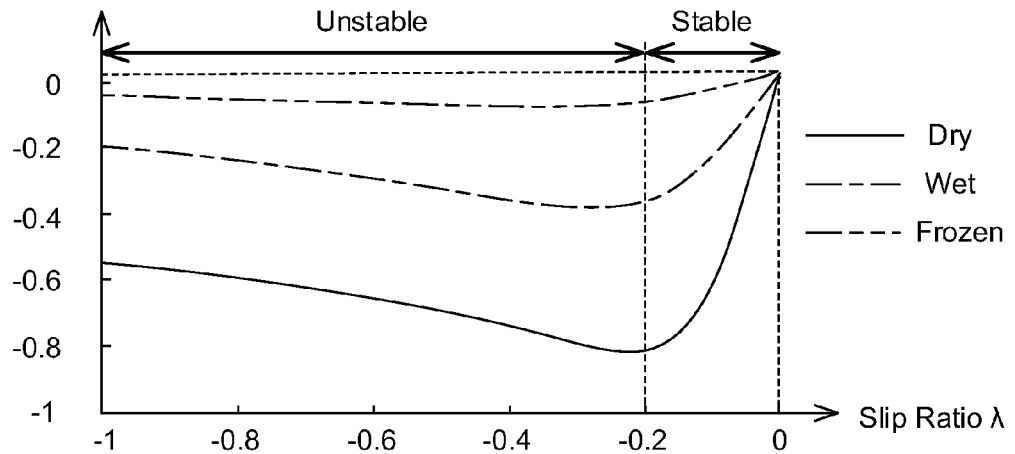
FIG. 3 is a figure showing the relationship between the slip ratio and the friction coefficient during braking.

The relationship $T_d = r \cdot F_d = r \cdot \mu \cdot N$ is established by (3) and (4) above. Due to this, if there is no change in the radius r of the driving wheel and the normal reaction force N, then, as shown by the thin lines in FIGS. 8 and 9, the slip ratio $\lambda$ and the driving torque $T_d$ have the same relationship as the slip ratio $\lambda$ and the friction coefficient $\mu$ of FIGS. 2 and 3. As will be understood from Equation (3), the rotational speed $\omega$ increases when the actual torque value $T_m$ is larger as compared to the value of the current driving torque $T_d$ during traveling, and the slip ratio $\lambda$ given Equation (5) also increases.

Figure 8:
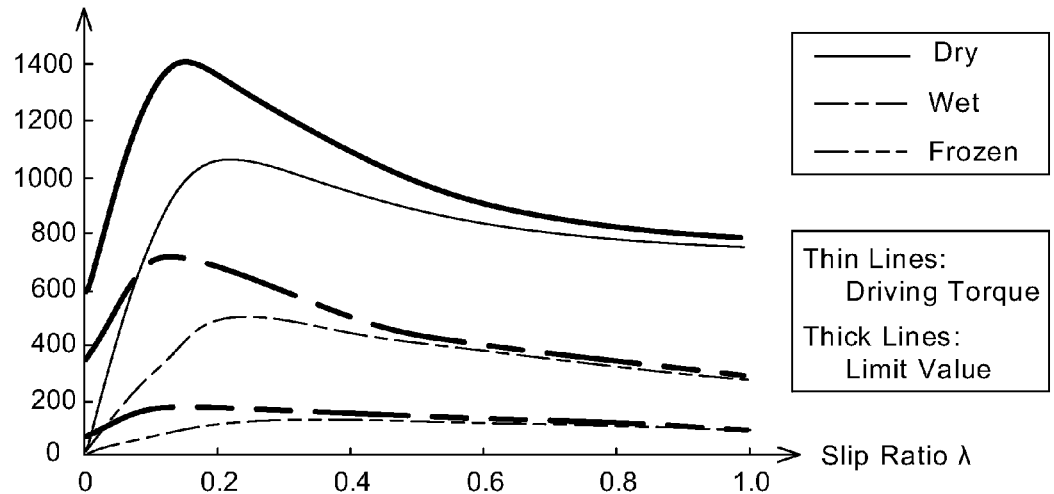
FIG. 8 is a figure for explanation of a relationship between the slip ratio, and the driving torque and a limit value (during driving)
Figure 9:
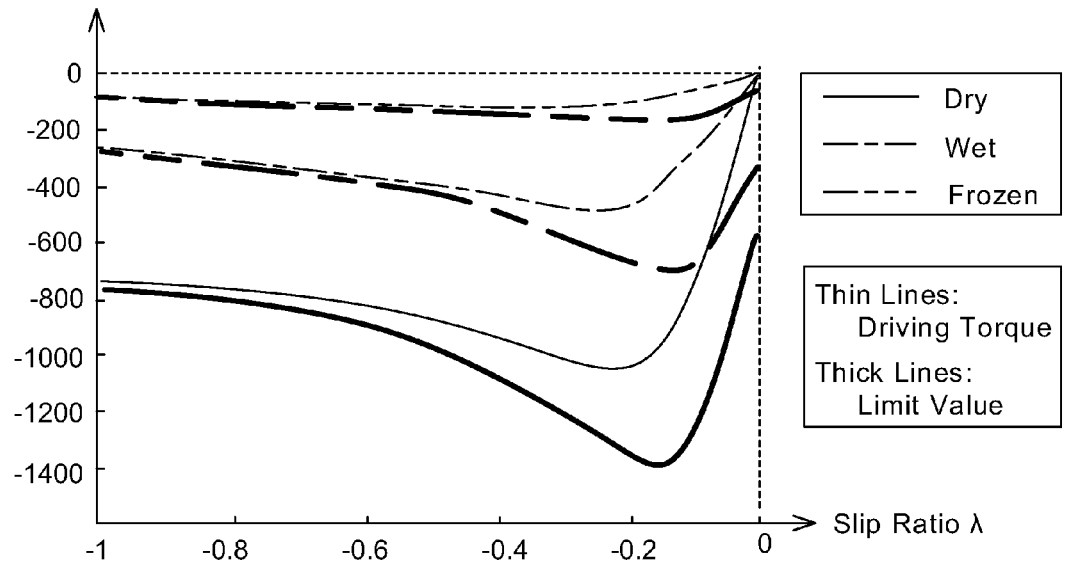
FIG. 9 is a figure for explanation of a relationship between the slip ratio, and the driving torque and a limit value (during braking)

In this case, the operation due to the value of the slip ratio $\lambda$ can be of two different types. If the slip ratio $\lambda$ is less than or equal to "0.2", then, as shown in FIGS. 8 and 9, the driving force $F_d$ increases since the driving torque $T_d$ also increases. By this, if the change of $F_{dr}$ due to the air resistance and so on is small, then the movement speed v also increases, as shown by Equation (2). Accordingly, it enables to travel in a stable manner, since the increase of the slip ratio $\lambda$ shown by Equation (5) is mitigated. On the other hand, if the slip ratio $\lambda$ undesirably becomes greater than "0.2", as shown in FIGS. 8 and 9, since the driving torque $T_d$ does not increase, accordingly also the driving force $F_d$ does not increase, and the movement speed v in Equation (2) does not increase. As a result the slip ratio given by Equation (5) progressively increases, which is undesirable, and accordingly traveling becomes unstable since the slip ratio $\lambda$ becomes yet greater.

Which type of operation will take place is determined by the relationship between the maximal value of the driving torque $T_d$ and the actual torque value $T_m$. If the actual torque value $T_m$ is sufficiently smaller than the maximal value of the driving torque $T_d$ with a certain clearance between them, then it is possible to maintain stable traveling. On the other hand, when the actual torque value $T_m$ is more or less equal to or greater than the maximal value of the driving torque $T_d$, the system enters the unstable region, which is undesirable.

Due to this, in this embodiment, the value of the current driving torque $T_d$ and the value of the slip ratio $\lambda$ are estimated. And motor control is performed so that the actual torque value $T_m$ does not become too great as compared to the value of the driving torque $T_d$ by limiting the torque setting value $T_s$ according to the limit value L, which is determined by Equation (7) using the above estimated values.

By using the limit value L that has been calculated according to Equation (7), along with it being possible to ensure that the value of the limit value L is closer to the driving torque $T_d$ the larger the slip ratio $\lambda$ is, it is also possible to ensure that the value of the limit value L is more removed from the driving torque $T_d$ the smaller the slip ratio $\lambda$ is. Examples of calculation of the limit value L according to Equation (7) are shown by the thick lines in FIGS. 8 and 9.

Accordingly, in this embodiment, the torque setting value $T_s$ is limited to a value that is closer to the current driving torque $T_d$, the greater the slip ratio $\lambda$ is. Moreover, since the torque limitation becomes weaker the smaller the slip ratio $\lambda$ is, accordingly a larger margin for the torque setting value $T_s$ to exceed the current driving torque $T_d$ is permitted.

Note that the larger the slip ratio $\lambda$ is, the closer the limit value L is to the driving torque $T_d$; accordingly, it is desirable for the constant a to have a value close to "1". Moreover, a stronger limitation can be imposed the smaller the limiter coefficient k is; accordingly, a strong torque limitation is imposed when the slip ratio $\lambda$ becomes great, so that as a result increase of the slip ratio $\lambda$ can be suppressed. However, if the slip ratio $\lambda$ is small and is within the stable region, then it is not desirable to make the limiter coefficient k too small, because it is not desirable to impose more than the necessary torque limitation.

[Operation]

Next, the operation of the traction control device 700 having a configuration such as described above will be explained.

Note that it will be supposed that the torque command value generation part 810, the acceleration detection part 820, and the motor drive system 900 have already started their operation, and that the torque command value $T_c$, the acceleration $\alpha$, the rotational position $\theta$, and the detected current value $I_D$ are being successively sent to the traction control device 700 (refer to FIG. 6).

In the traction control device 700, during traction control, the movement speed acquisition part 710 acquires the movement speed v by performing time integration of the acceleration $\alpha$ sent from the acceleration detection part 820. And the movement speed acquisition part 710 successively sends the movement speed v that it has thus acquired to the control part 740 (refer to FIG. 6).

Moreover, the rotational speed acquisition part 720 acquires the rotational speed $\omega$ by performing time differentiation of the rotational position $\theta$ sent from the rotational position detection part 940. And the rotational speed acquisition part 720 successively sends the rotational speed $\omega$ that it has thus acquired to the control part 740 (refer to FIG. 6).

Furthermore, the actual torque value acquisition part 730 performs acquisition of the actual torque value $T_m$ by calculating the actual torque value $T_m$ on the basis of the detected current value $I_D$ sent from the current detection part 950. And the actual torque value acquisition part 730 successively sends the actual torque value $T_m$ that it has thus acquired to the control part 740 (refer to FIG. 6).

In the control part 740, the slip ratio estimation part 741 performs slip ratio estimation by calculating the slip ratio $\lambda$ according to the above Equation (5), on the basis of the movement speed v sent from the movement speed acquisition part 710 and the rotational speed $\omega$ sent from the rotational speed acquisition part 720. And the slip ratio estimation part 741 successively sends the slip ratio $\lambda$ that has thus been estimated to the limit value calculation part 743 (refer to FIG. 7).

Furthermore, the driving torque estimation part 742 performs driving torque estimation by calculating the estimated driving torque $T_d$ by passing the value determined according to Equation (6) on the basis of the rotational speed $\omega$ sent from the rotational speed acquisition part 720 and the actual torque value $T_m$ sent from the actual torque value acquisition part 730 through a low pass filter (i.e. an LPF). And the driving torque estimation part 742 successively sends the estimated driving torque $T_d$ to the limit value calculation part 743 (refer to FIG. 7).

Moreover, the limit value calculation part 743 calculates the limit value L according to the Equation (7), on the basis of the slip ratio λ sent from the slip ratio estimation part 741 and the driving torque $T_d$ sent from the driving torque estimation part 742. And the limit value calculation part 743 successively sends the limit value L that it has thus calculated to the limiter part 744 (refer to FIG. 7).

The limiter part 744 calculates the torque setting value $T_s$ by performing limitation control upon the torque command value $T_c$ on the basis of the limit value L sent from the limit value calculation part 743, as described above. And the limiter part 744 successively sends the torque setting value $T_s$ that it has thus calculated to the motor drive system 900 (refer to FIG. 7).

On the basis of the torque setting value $T_s$ sent from the traction control device 700, current corresponding to the torque setting value $T_s$ is supplied to the motor 930 by the motor drive system 900. As a result, the motor 930 is driven with a torque value that corresponds to the torque setting value $T_s$.

As has been explained above, in this embodiment, the movement speed v of the moving body MV having this driving wheel that is driven by the motor 930, the rotational speed ω of the driving wheel of the moving body MV, and the actual torque value $T_m$ generated by the motor 930 are acquired. And the movement speed v, the rotational speed ω, and the actual torque value $T_m$ can be acquired quickly.

Next, on the basis of the speed of movement v and the rotational speed ω, the control part 740 estimates the slip ratio λ of the driving wheel by using Equation (5), with which quick calculation is possible. Moreover, on the basis of the speed of movement v and the actual torque value $T_m$, the control part 740 estimates the driving torque $T_d$ of the driving wheel by using Equation (6), with which quick calculation is also possible.

Next, on the basis of the slip ratio λ and the driving torque $T_d$, the control part 740 calculates the limit value L for the torque command value $T_c$ by using Equation (7), with which quick calculation is likewise possible. And the control part 740 performs limitation processing upon the torque command value $T_c$ by using this limit value L and thereby generates the torque setting value $T_s$, and sends this torque setting value $T_s$ that it has thus generated to the motor drive system 900.

Thus, according to this embodiment, it enables to implement control for traveling in a stable manner while still ensuring the necessary drive power, rapidly according to change of the state of the road surface.

[Modification of the Embodiment]

The present invention is not to be considered as being limited to the embodiment described above; modifications of various kinds are possible.

For example, in the embodiment, it was arranged to calculate a limit value for each of the driving wheels. By contrast, if the moving body has a plurality of driving wheels, then it would be possible to arrange to use the minimal one of the limit values for each of the plurality of driving wheels, obtained in a similar manner as in the case of the embodiment described above, as a limit value for the torque command values for all of the plurality of driving wheels. In this case, it may ensure stable traveling, because it would be possible to suppress differences in the torque setting values between the plurality of driving wheels.

Furthermore, in the embodiment, it was arranged for the control part 740 to calculate the limit value according to Equation (7). By contrast, the value within parentheses on the right side of Equation (7) could be calculated in advance for each value of the slip ratio, and a reference table could be constructed giving the correlation between the slip ratios and the results of those calculations. And then, it may be arranged to calculate the limit value by multiplying the driving torque by a value that is read out from the reference table on the basis of the estimated slip ratio.

Moreover, in the embodiment, it was supposed that the response speed of the driving torque of the driving wheel to the torque setting value was quick, as is the case with an in-wheel motor. By contrast, if the response of the driving torque of the driving wheel to the torque setting value cannot be considered to be quick, it may also be acceptable to arrange to calculate the limit value L according to the following Equation (8) or according to the following Equation (9):

$$L = T_d \cdot (b + k_{11}/\lambda^2) \quad (8)$$

Here, the constant b and the limiter coefficient $k_{11}$ are determined in advance by experiment, simulation, or the like, from the standpoint of ensuring good driving torque upon a dry road surface, while implementing stable travel irrespective of the state of the road surface.

$$L = T_d \cdot \{(c + k_{21}/\lambda^2 - k_{22} \cdot (d\lambda/dt)\} \quad (9)$$

Here, the constant c and the limiter coefficients $k_{21}$ and $k_{22}$ are determined in advance by experiment, simulation, or the like, from the standpoint of ensuring good driving torque upon a dry road surface, while implementing stable travel irrespective of the state of the road surface.

Note that it may be acceptable to arrange to execute partial or all of the functions of the traction control device of the embodiment described above by building the traction control device of the embodiment described above as a computer that functions as a calculation means comprising a central processing device (CPU: Central Processing Unit) and a DSP (Digital Signal Processor) and so on, and by that computer executing a program that has been prepared in advance. This program may be recorded upon a recording medium that can be read by the computer, such as a hard disk, a CD-ROM, a DVD or the like, or may be loaded from the recording medium and executed by that computer. Moreover, it would be acceptable to arrange for the program to be acquired by the method of being recorded upon a transportable medium such as a CD-ROM, a DVD or the like; or it could also be arranged for it to be acquired by the method of being distributed via a network such as the internet or the like.

EXAMPLES

Next, an example of the present invention will be explained with principal reference to FIGS. 10 through 17. Note that in the following explanation, and including the embodiment described above, the same reference symbols are appended to elements that are the same or equivalent, and duplicated explanation is curtailed as far as possible.

[Configuration]

Figure 10:
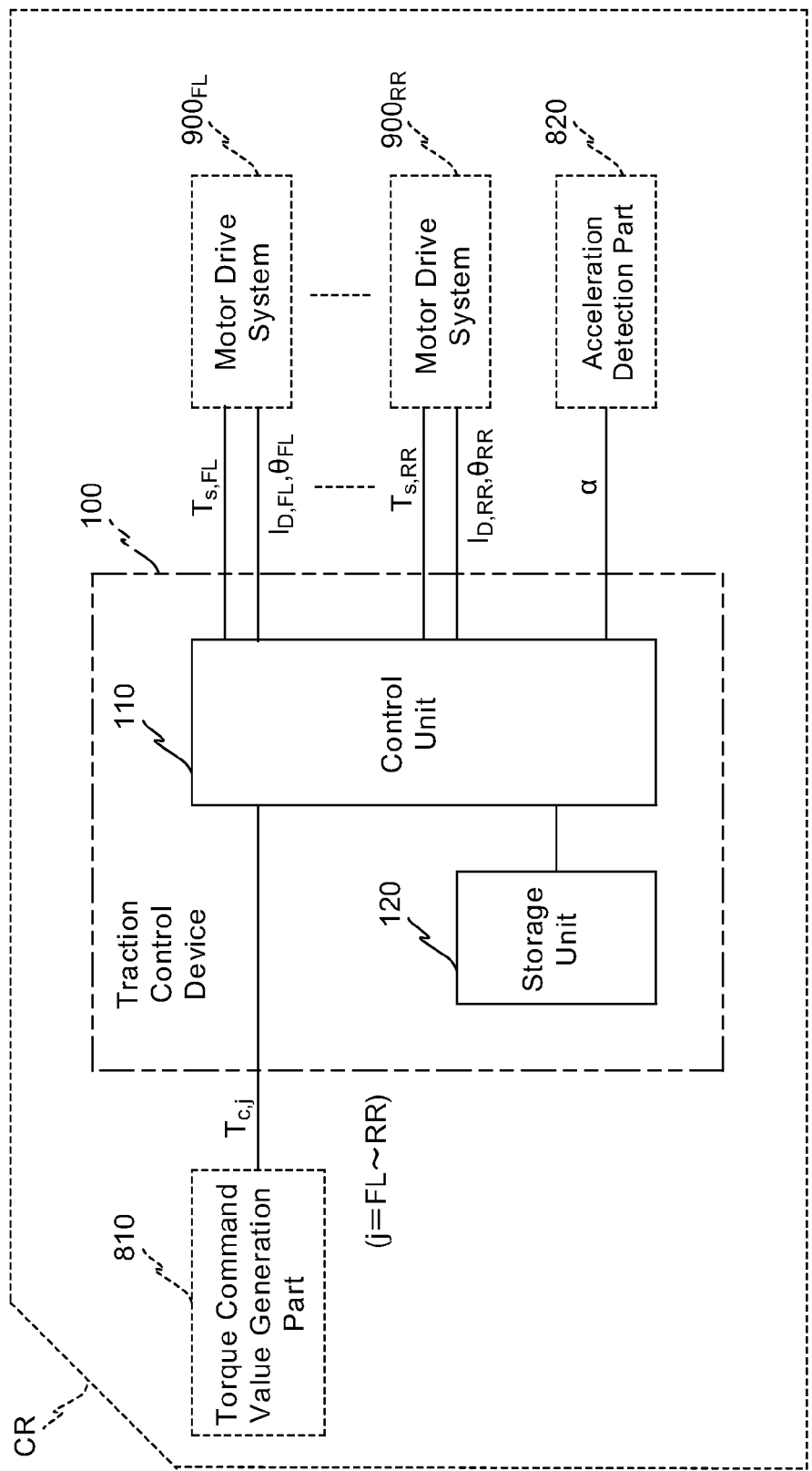
FIG. 10 is a block diagram schematically showing the configuration of a traction control device according to an example of the present invention.

The configuration of a traction control device 100 according to the example is schematically shown in FIG. 10. The traction control device 100 is one version of one variant embodiment of the traction control device 700 according to the embodiment described above.

As shown in FIG. 10, this traction control device 100 is arranged within a vehicle CR, which corresponds to the moving body MV. Note that the vehicle CR comprises four driving wheels that can be independently driven: a left front driving wheel $WH_{FL}$, a right front driving wheel $WH_{FR}$, a left rear driving wheel $WH_{RL}$, and a right rear driving wheel $WH_{RR}$.

In addition to the traction control device 100, a torque command value generation part 810, an acceleration detection part 820, and motor drive systems $900_{FL}$ through $900_{RR}$ are provided to the vehicle CR. Here, each of the motor drive systems $900_j$ (where j=FL–RR) has a configuration similar to that of the motor drive system 900 explained in connection with the embodiment described above.

In other words, each of the motor drive systems $900_j$ comprises a drive control part $910_j$ that has a similar function to that of the drive control part 910 described above, an inverter $920_j$ that has a similar function to that of the inverter 920 described above, and a motor $930_j$ that has a similar function to that of the motor 930 described above. Moreover, the motor drive system $900_j$ comprises a rotational position detection part $940_j$ that has a similar function to that of the rotational position detection part 940 described above, and a current detection part $950_j$ that has a similar function to that of the current detection part 950 described above.

Here, the drive control part $910_j$ calculates its drive voltage on the basis of a torque setting value $T_{s,j}$ sent from the traction control device 100, a rotational position $\theta_j$ detected by the rotational position detection part $940_j$, and a detected current value $I_{D,j}$ detected by the current detection part $950_j$. And the drive control part $910_j$ sends this drive voltage that it has thus calculated to the inverter $920_j$.

Moreover, the rotational position detection part $940_j$ detects the rotational position $\theta_j$ of the motor $930_j$. And the rotational position detection part $940_j$ sends the rotational position $\theta_j$ that it has thus detected to the traction control device 100 and to the drive control part $910_j$.

Furthermore, the current detection part $950_j$ detects the value of the current flowing to the motor $930_j$. And the current detection part $950_j$ sends the current value that it has thus detected to the traction control device 100 and to the drive control part $910_j$ as the detected current value $I_{D,j}$.

Note that torque command values $T_{c,FL}$ through $T_{c,RR}$ that correspond to the four driving wheels $WH_{FL}$ through $WH_{RR}$ are sent to the traction control device 100 from the torque command value generation part 810.

<Configurations of the Drive Control Parts $910_j$ and the Current Detection Parts $950_j$>

Figure 11:
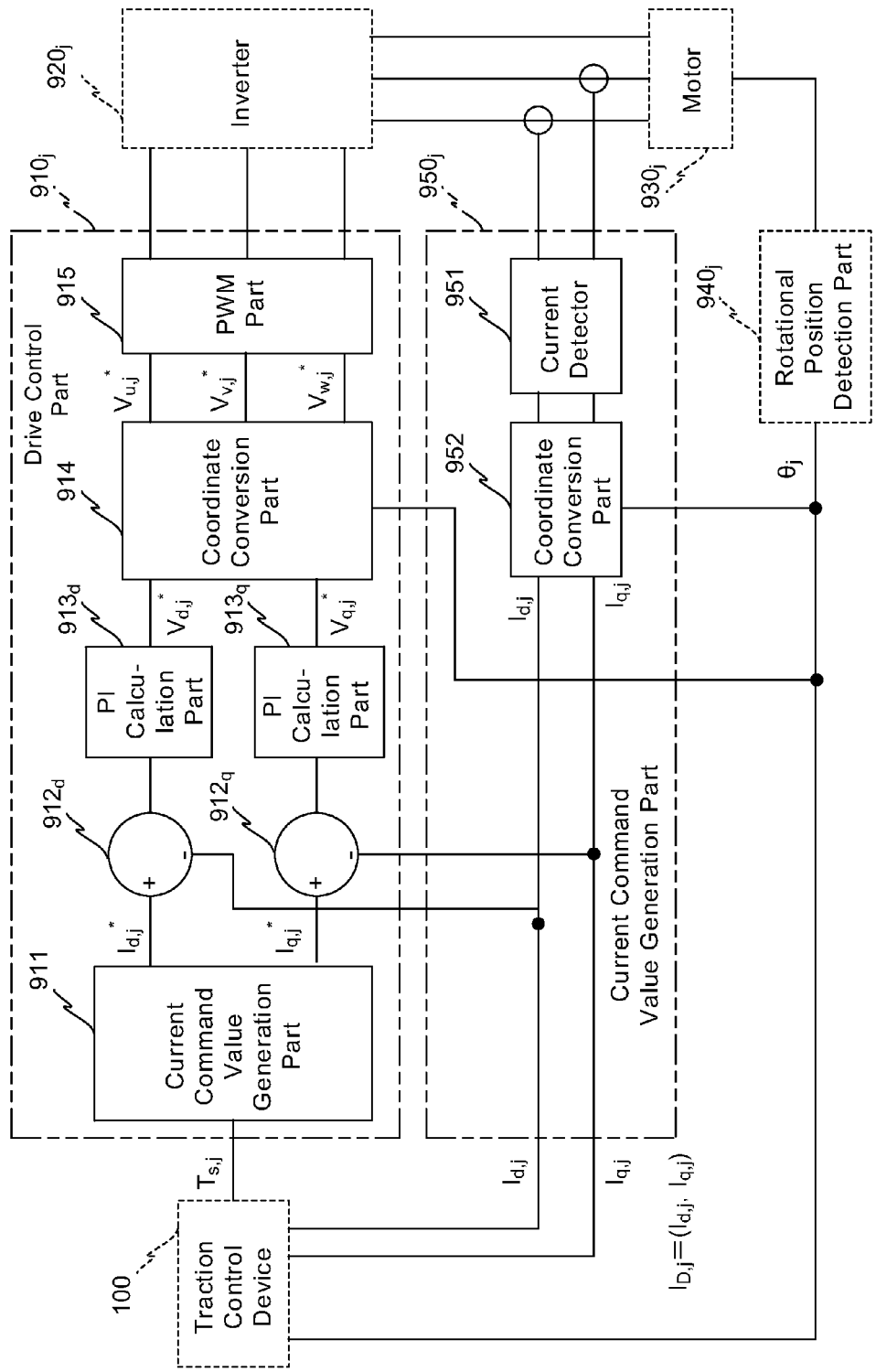
FIG. 11 is a block diagram for explanation of the configuration of a drive control part and a current detection part in a motor drive system of FIG. 10.

Now one of the drive control parts $910_j$ and one of the current detection parts $950_j$ will be explained in more detail with reference to FIG. 11. Note that, in this example, the motors $930_j$ are three-phase motors.

First, the drive control part $910_j$ will be explained. The drive control part $910_j$ controls the driving of the motor $930_j$ by vector control. The drive part $910_j$ having this function comprises a current command value generation part 911, subtraction parts $912_d$ and $912_q$, and proportional and integration (PI) calculation parts $913_d$ and $913_q$. Moreover, the drive control part $910_j$ comprises a coordinate conversion part 914 and a pulse width modulation (PWM) part 915.

The current command value generation part 911 receives the torque setting value $T_{s,j}$ sent from the traction control device 100. And the current command value generation part 911 generates a d axis current command value $I_{d,j}*$ and a q axis current command value $I_{q,j}*$ that will generate a motor torque equal to the torque setting value $T_{s,j}$. The d axis current command value $I_{d,j}*$ that has been generated in this manner is sent to the subtraction part $912_d$, and the q axis current command value $I_{q,j}*$ is sent to the subtraction part $912_q$.

The subtraction part $912_d$ receives the d axis current command value $I_{d,j}*$ sent from the current command value generation part 911. And the subtraction part $912_d$ subtracts the d axis detected current value $I_{d,j}$ sent from the current detection part $950_j$ from this d axis current command value $I_{d,j}*$. The result of this subtraction by the subtraction part $912_d$ is sent to the PI calculation part $913_d$.

And the subtraction part $912_q$ receives the q axis current command value $I_{q,j}*$ sent from the current command value generation part 911. And, the subtraction part $912_q$ subtracts the q axis detected current value $I_{q,j}$ sent from the current detection part $950_j$ from this q axis current command value $I_{q,j}*$. The result of this subtraction by the subtraction part $912_q$ is sent to the PI calculation part $913_q$.

The PI calculation part $913_d$ receives the subtraction result sent from the subtraction part $912_d$. And the PI calculation part $913_d$ calculates a d axis voltage command value $V_{d,j}*$ by performing proportional calculation and integration calculation on the basis of this subtraction result. The d axis voltage command value $V_{d,j}*$ that has been calculated by the PI calculation part $913_d$ is sent to the coordinate conversion part 914.

The PI calculation part $913_q$ receives the subtraction result sent from the subtraction part $912_q$. And, the PI calculation part $913_q$ calculates a q axis voltage command value $V_{q,j}*$ by performing proportional calculation and integration calculation on the basis of this subtraction result. The q axis voltage command value $V_{q,j}*$ that has been calculated by the PI calculation part $913_q$ is sent to the coordinate conversion part 914.

The coordinate conversion part 914 receives the d axis voltage command value $V_{d,j}*$ sent from the PI calculation part $913_d$ and the q axis voltage command value $V_{q,j}*$ sent from the PI calculation part $913_q$. And the coordinate conversion part 914 refers to the rotational position $\theta_j$ sent from the rotational position detection part $940_j$, and calculates a u axis control voltage value $V_{u,j}*$, a v axis control voltage value $V_{v,j}*$, and a w axis control voltage value $V_{w,j}*$ by performing coordinate conversion upon the d axis voltage command value $V_{d,j}*$ and the q axis voltage command value $V_{q,j}*$. The results of the calculation in the coordinate conversion part 914 are sent to the PWM part 915.

The PWM part 915 receives the three-phase control voltages sent from the coordinate conversion part 914. And the PWM part 915 generates a three-phase PWM signal by performing pulse with modulation upon these three-phase control voltages. The three-phase PWM signal that has been generated in this manner is sent to the inverter $920_j$.

Next, the current detection part $950_j$ will be explained. The current detection part $950_j$ comprises a current detector 951 and a coordinate conversion part 952.

The current detector 951 detects the value of the u axis current and the value of the v axis current flowing to the motor $930_j$. And the current detector 951 sends the results of this detection to the coordinate conversion part 952 as a u axis detected current value $I_{u,j}$ and a v axis detected current value $I_{v,j}$. Note that, while it would also be acceptable to detect the w axis current value $(I_{w,j})$, it is also possible to manage without detecting this w axis current value $(I_{w,j})$, since the relationship "$I_{u,j}+I_{v,j}+I_{w,j}$" holds.

Finally, the coordinate conversion part 952 receives the u axis detected current value $I_{u,j}$ and the v axis detected current value $I_{v,j}$ sent from the current detector 951. And the coordinate conversion part 952 refers to the rotational position $\theta_j$ sent from the rotational position detection part $940_j$, and calculates a d axis detected current value $I_{d,j}$ and a q axis detected current value $I_{q,j}$ by performing coordinate conversion upon the u axis detected current value $I_{u,j}$ and the v axis detected current value $I_{v,j}$. The results of this calculation by the coordinate conversion part 952 are sent to the traction control device 100 and to the drive control part $910_j$ as detected current values $I_{D,j}$.

Note that the magnitude $|I_{D,j}|$ of $I_{D,j}$ is calculated according to the following Equation (10):

$$|I_{D,j}|=(I_{d,j}^2+I_{q,j}^2)^{1/2} \qquad (10)$$

<Configuration of the Traction Control Device 100>

Next, the configuration of the traction control device 100 will be explained.

Returning to FIG. 10, the traction control device 100 comprises a control unit 110 and a storage unit 120.

The control unit 110 comprises a central processing device (CPU) and a DSP (Digital Signal Processor) as a calculation means. And, by executing a program, the control unit 110 performs the functions of the movement speed acquisition part 710, the rotational speed acquisition part 720, the actual torque value acquisition part 730, and the control part 740 in the embodiment described above.

The program executed by the control unit 110 is stored in the storage unit 120, and is loaded from the storage unit 120 and executed. It would be acceptable to arrange for the program to be acquired by the method of being recorded upon a transportable recording medium such as a CD-ROM or a DVD or the like; or it may also be acquired by the method of being distributed via a network such as the internet or the like.

Note that the processing performed by the control unit 110 will be described hereinafter.

The storage unit 120 stores information and data of various kinds used by the control unit 110. The program executed by the control unit 110 is included in this information and data. The control unit 110 is adapted to be capable of accessing this storage unit 120.

[Operation]

Next, the operation for traction control performed by the traction control device 100 having the configuration described above will be explained, with particular attention being directed to the processing performed by the control unit 110.

Note that it will be supposed that the torque command value generation part 810, the acceleration detection part 820, and the motor drive system 900 have already started their operation, and that the torque command value $T_{c,j}$, the acceleration $\alpha$, the rotational position $\theta_j$, and the detected current value $I_{D,j}$ are being successively sent to the traction control device 700 (refer to FIG. 10).

Figure 12:
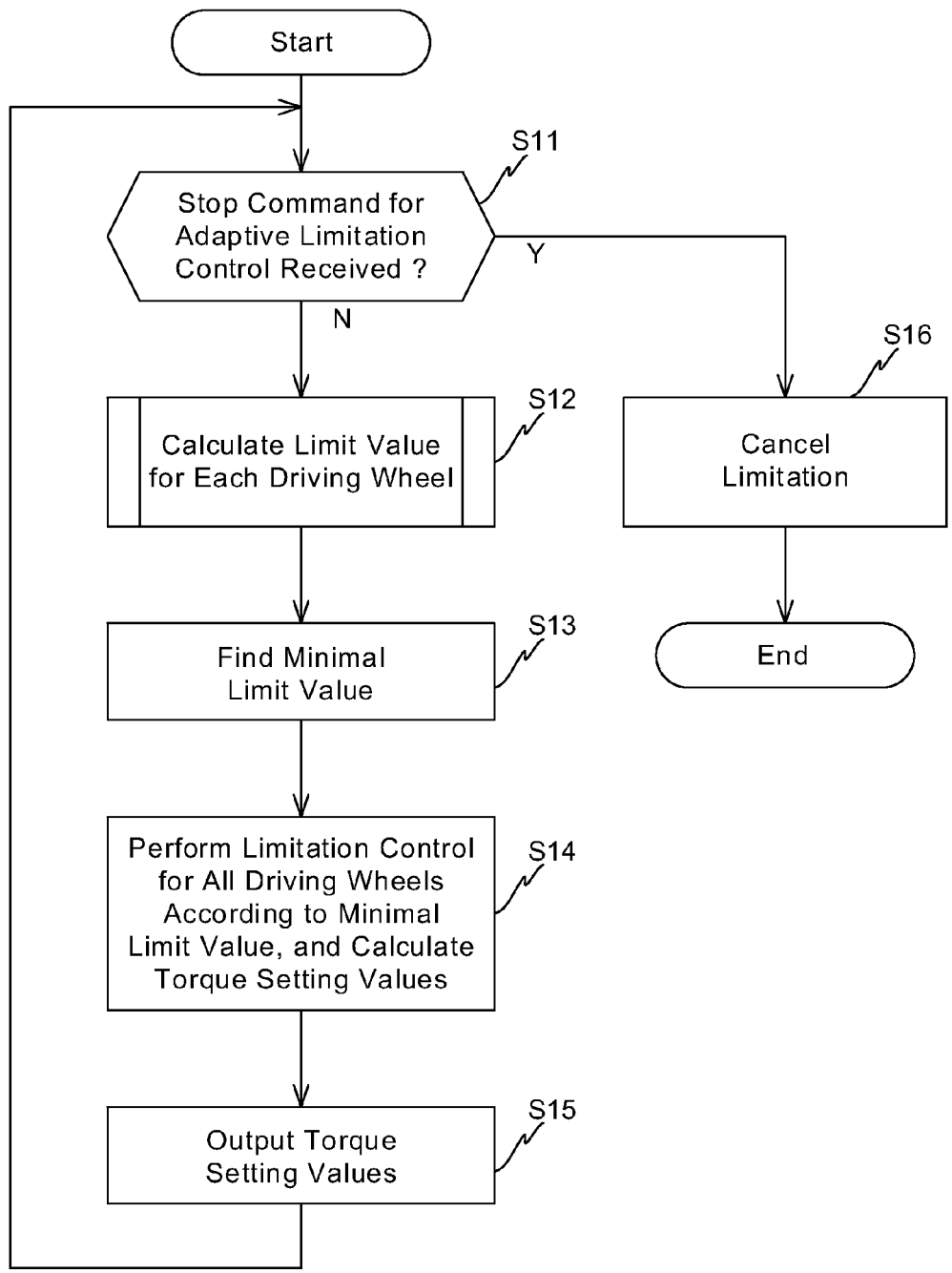
FIG. 12 is a flow chart for explanation of processing by the device of FIG. 10 for performing traction control.

Traction control is started by the user inputting a start command for adaptive limitation control via an input part not shown in the figures. During this limitation control, as shown in FIG. 12, first in a step S11 the control unit 110 decides whether or not a stop command for adaptive limitation control has been received via that input part. If the result of the decision in the step S11 is negative (N in the step S11), the flow of control proceeds to a step S12.

In the step S12, the control unit 110 calculates limit values $L_{FL}$ through $L_{RR}$ for each of the four driving wheels $WH_{FL}$ through $WH_{RR}$. Note that the processing for calculating these limit values $L_{FL}$ through $L_{RR}$ in this step S12 will be described hereinafter.

Next in a step S13 the control unit 110 finds the minimal limit value $L_{min}$ of the limit values $L_{FL}$ through $L_{RR}$ that have thus been calculated. And the control unit 110 takes the minimal limit value $L_{min}$ that has thus been found as a common limit value for all of the four driving wheels $WH_{FL}$ through $WH_{RR}$.

And next, in a step S14, on the basis of this minimal limit value $L_{min}$, the control unit 110 performs limitation control upon the torque command values $T_{c,FL}$ through $T_{c,RR}$ sent from the torque command value generation part 810, and thereby calculates torque setting values $T_{s,FL}$ through $T_{s,RR}$.

Then in a step S15 the control unit 110 successively sends the torque setting values $T_{s,FL}$ through $T_{s,RR}$ that have thus been calculated to the motor drive systems $900_{FL}$ through $90_{RR}$ (refer to FIG. 10).

As a result, if a torque command value $T_{c,j}$ (where j=FL, FR, RL, or RR) is less than or equal to the minimal limit value $L_{min}$, then the torque command value $T_{c,j}$ is outputted to the motor drive system $900_j$ as the torque setting value $T_{s,j}$. Moreover, if a torque command value $T_{c,j}$ is greater than the minimal limit value $L_{min}$, then the minimal limit value $L_{min}$ is outputted to the motor drive system $900_j$.

When the processing of the step S15 ends, the flow of control returns to the step S11. And subsequently the processing of the steps S11 through S15 is repeated until the result of the decision in the step S11 becomes affirmative.

When a stop command for adaptive limitation control is received and the result of the decision in the step S11 becomes affirmative (Y in the step S11), the flow of control proceeds to a step S16. In the step S16, the control unit 110 performs limitation cancellation. As a result, irrespective of the magnitudes of the torque command values $T_{c,j}$, the torque command values $T_{c,j}$ are outputted to the motor drive systems $900_j$ as the torque setting values $T_{s,j}$.

<Processing for Calculating the Limit Values $L_{FL}$ Through $L_{RR}$>

Next, the processing for calculating the limit values $L_{FL}$ through $L_{RR}$ will be explained.

Figure 13:
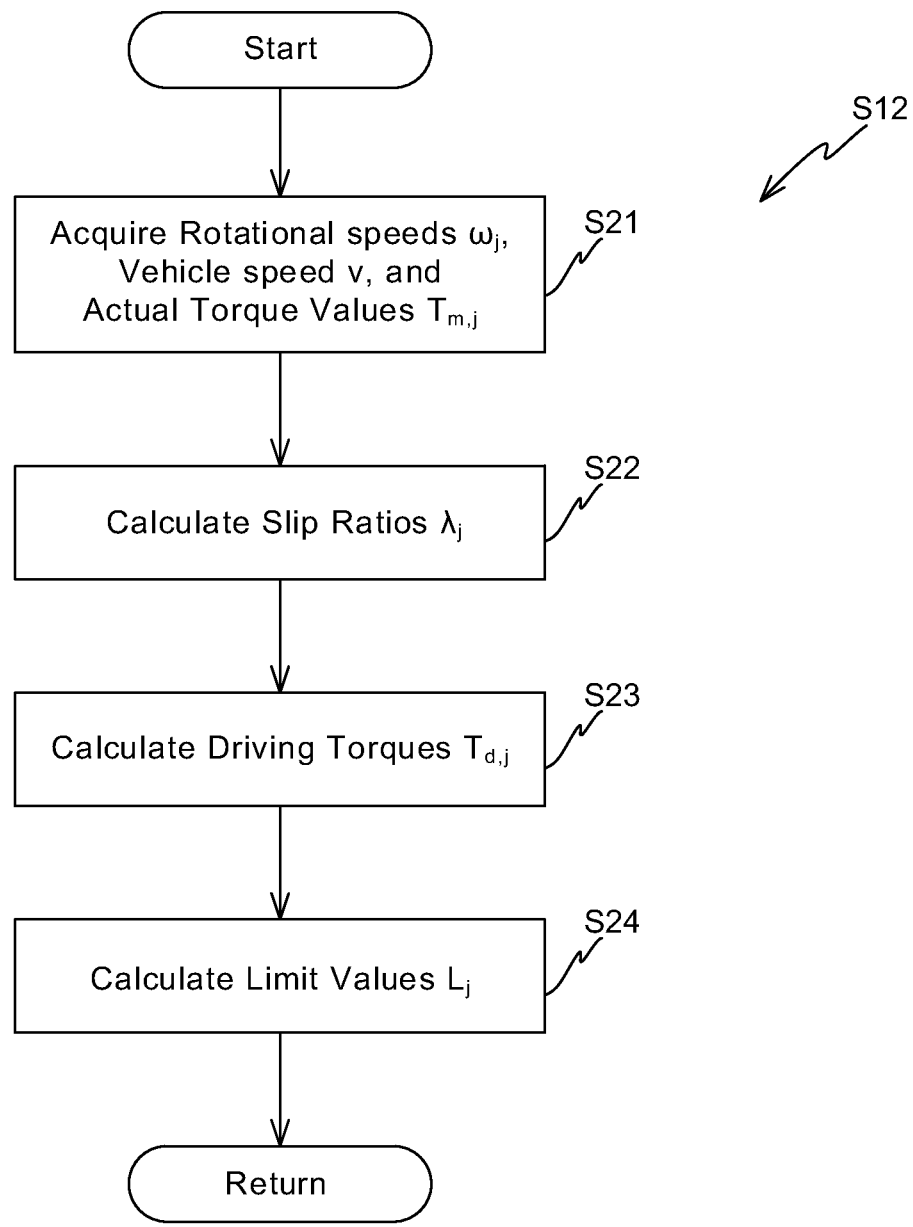
FIG. 13 is a flow chart for explanation of processing for calculation of a limit value for each of the driving wheels of FIG. 12.

During the processing in the step S12 for calculation of the limit values $L_j$, as shown in FIG. 13, first in a step S21 the control unit 110 gathers the acceleration $\alpha$, the rotational positions $\theta_j$, and the detected current values $I_{D,j}$. And the control unit 110 acquires the vehicle speed v (i.e. the movement speed) by performing time integration of the acceleration $\alpha$, and acquires the rotational speeds $\omega_j$ by performing time differentiation of the rotational positions $\theta_j$.

Moreover, on the basis of the detected current values $I_{D,j}$, the control unit 110 calculates the motor current values $I_{m,j}$ (=$|I_{D,j}|$) by using the above Equation (10). And the control unit 110 calculates the actual torque values $T_{m,j}$ by using the above Equation (1), and thereby acquires the actual torque values $T_{m,j}$.

Next in a step S22, on the basis of the vehicle speed v and the rotational speeds $\omega_j$, the control unit 110 performs slip ratio estimation by calculating the slip ratios $\lambda_j$ according to Equation (5). And then in a step S23, on the basis of the rotational speeds $\omega_j$ and the actual torque values $T_{m,j}$, the control unit 110 passes the values obtained according to Equation (6) through a low pass filter (i.e. an LPF), and thereby performs driving torque estimation by calculating the driving torques $T_{d,j}$.

Then in a step S24, on the basis of the slip ratios $\lambda_j$ and the driving torques $T_{d,j}$, the control unit 110 calculates the limit values $L_j$ according to the following Equation (11), which is derived by setting the constant a to "1" and the limiter coefficient k to "0.01" in Equation (7) above.

$$L_j=T_{d,j}\cdot(1+0.01/\lambda_j) \qquad (11)$$

When the processing of the step S24 is completed, the processing of the step S12 terminates. And then the flow of control proceeds to the step S13 of FIG. 12 described above.

Figure 14:
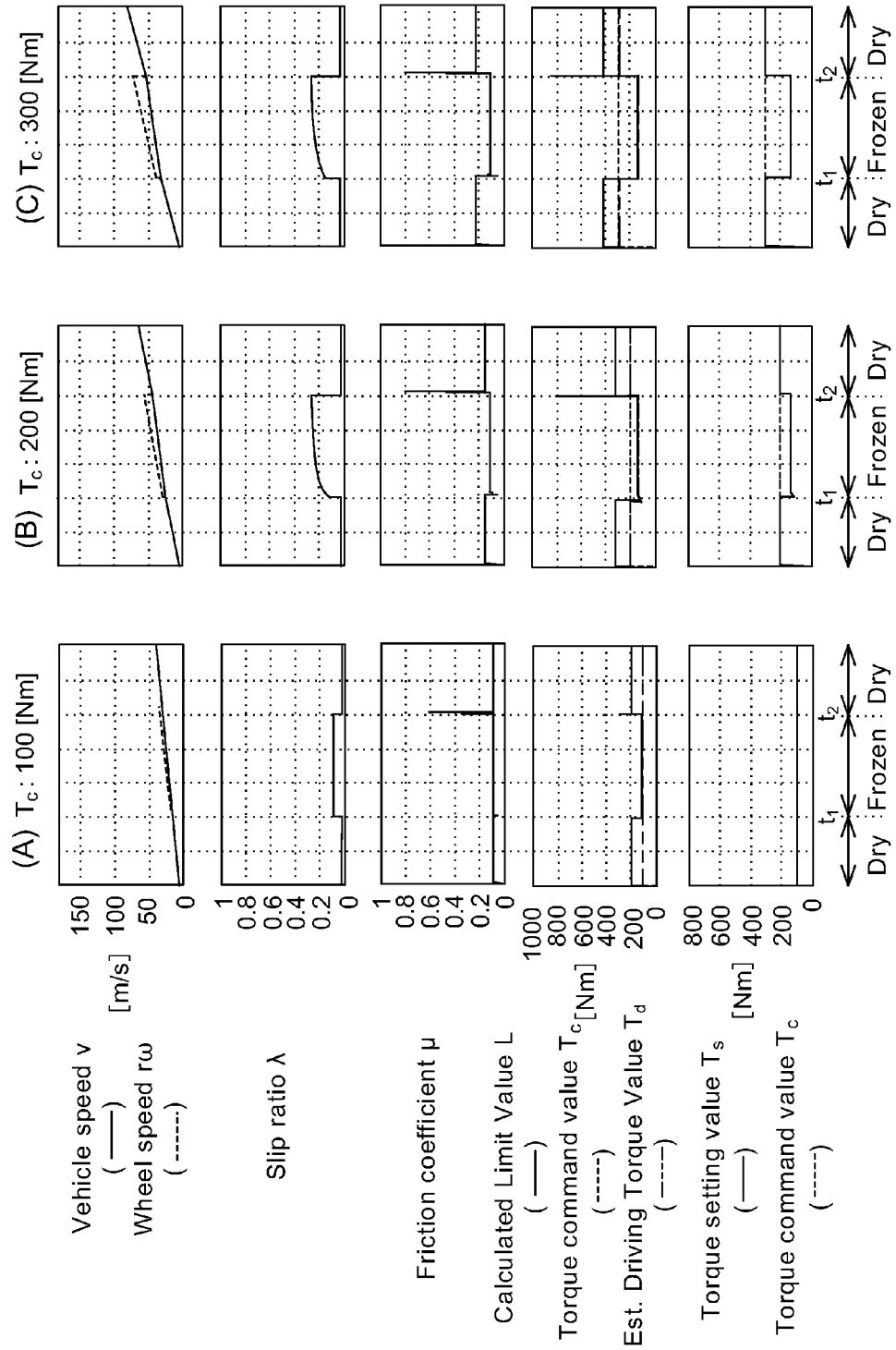
FIG. 14 is the first figure showing results of simulation of traction processing by the device of FIG. 10 during driving.
Figure 15:
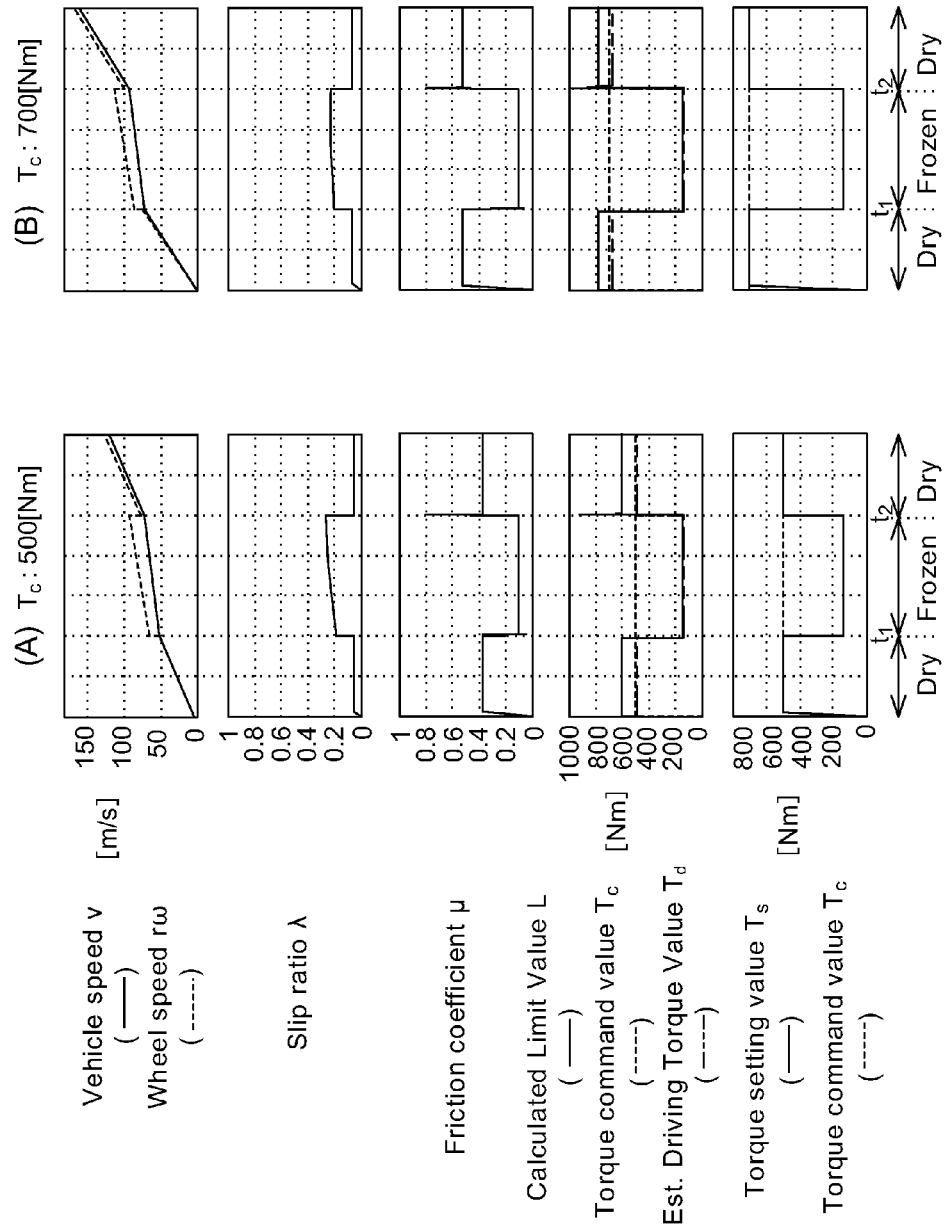
FIG. 15 is the second figure showing results of simulation of traction processing by the device of FIG. 10 during driving.
Figure 16:
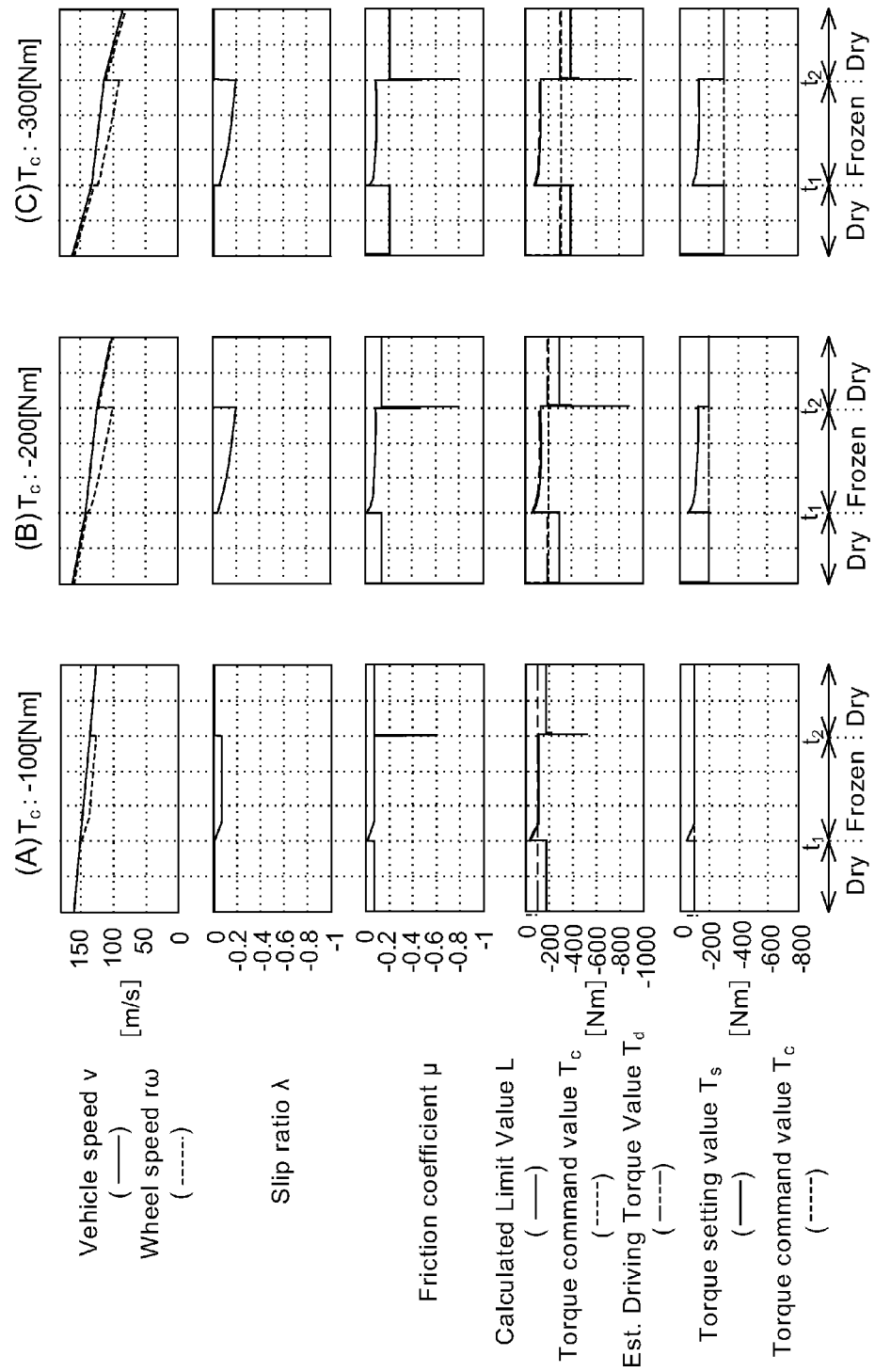
FIG. 16 is the first figure showing results of simulation of traction processing by the device of FIG. 10 during braking.
Figure 17:
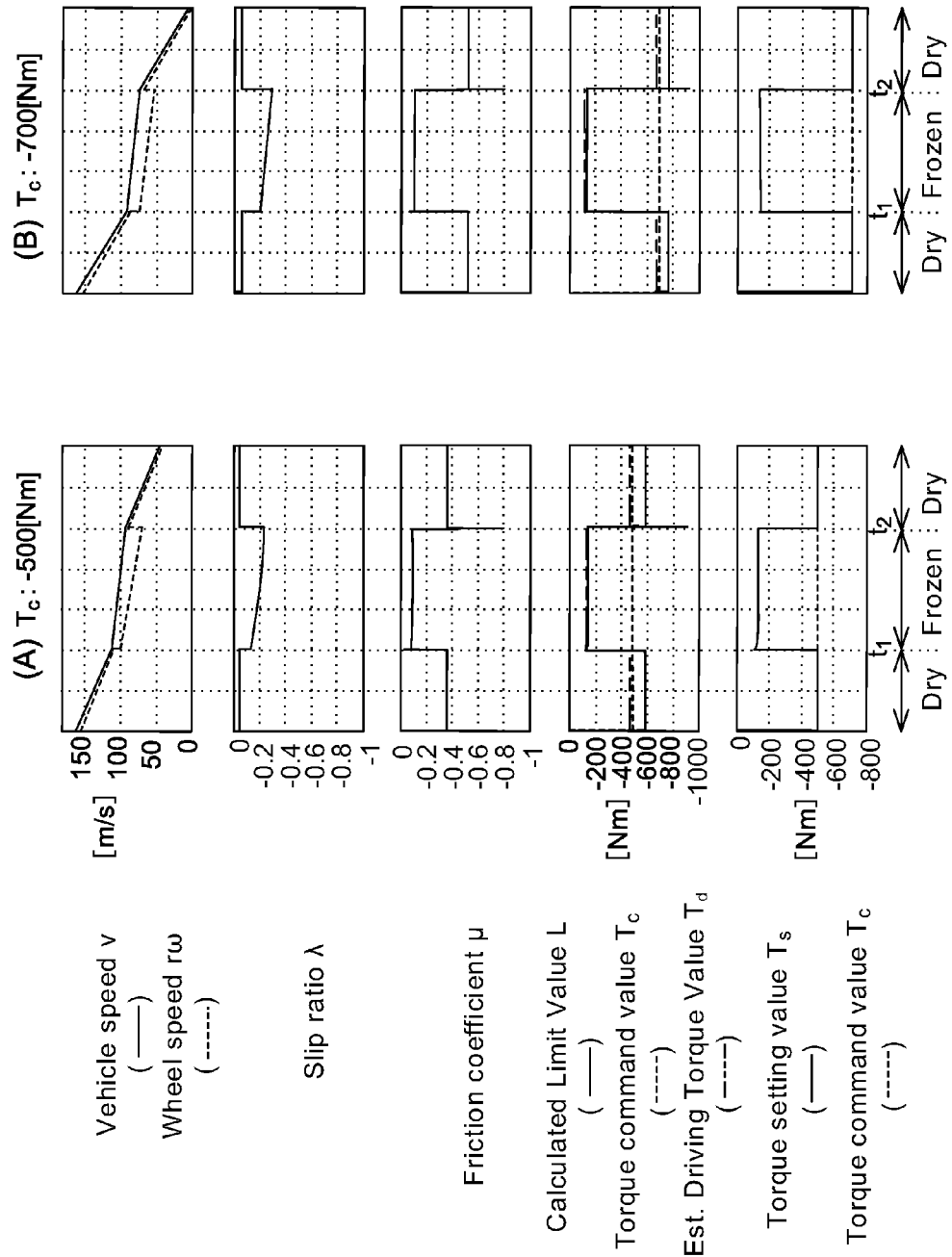
FIG. 17 is the second figure showing results of simulation of traction processing by the device of FIG. 10 during braking.

Note that the results of simulation of the anti-slip performance due to the example during driving are shown in FIGS. 14 and 15. Moreover, the results of simulation of the anti-slip performance due to this example during braking are shown in FIGS. 16 and 17. Note that, in a similar manner to the case of the simulations for when the limitation control was not performed, the conditions employed for the simulations were that: the electric automobile was a four wheel drive vehicle; its weight was 1800 [kg]; the moment of inertia of the driving wheel WH was 1.2 [kg·m²]; and the torque response of the motor was 5 [ms]. Moreover, the simulations were performed under the assumption that the road surface changed from dry to frozen at the time point $t_1$, and changed back from frozen to dry at the time point $t_2$ ($>t_1$).

Figure 4:
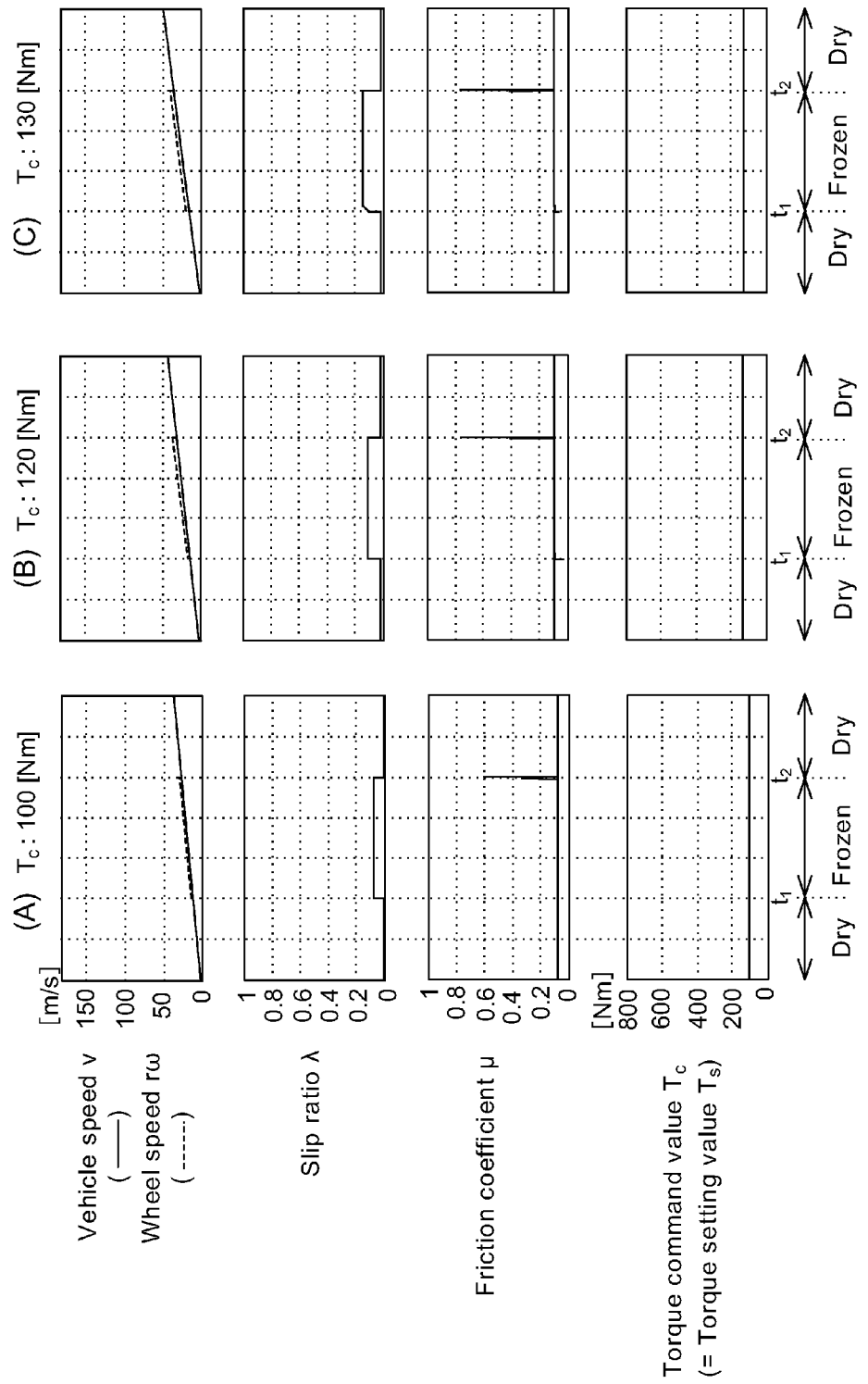
FIG. 4 is the first figure showing results of simulation when traction control is not being performed.
Figure 5:
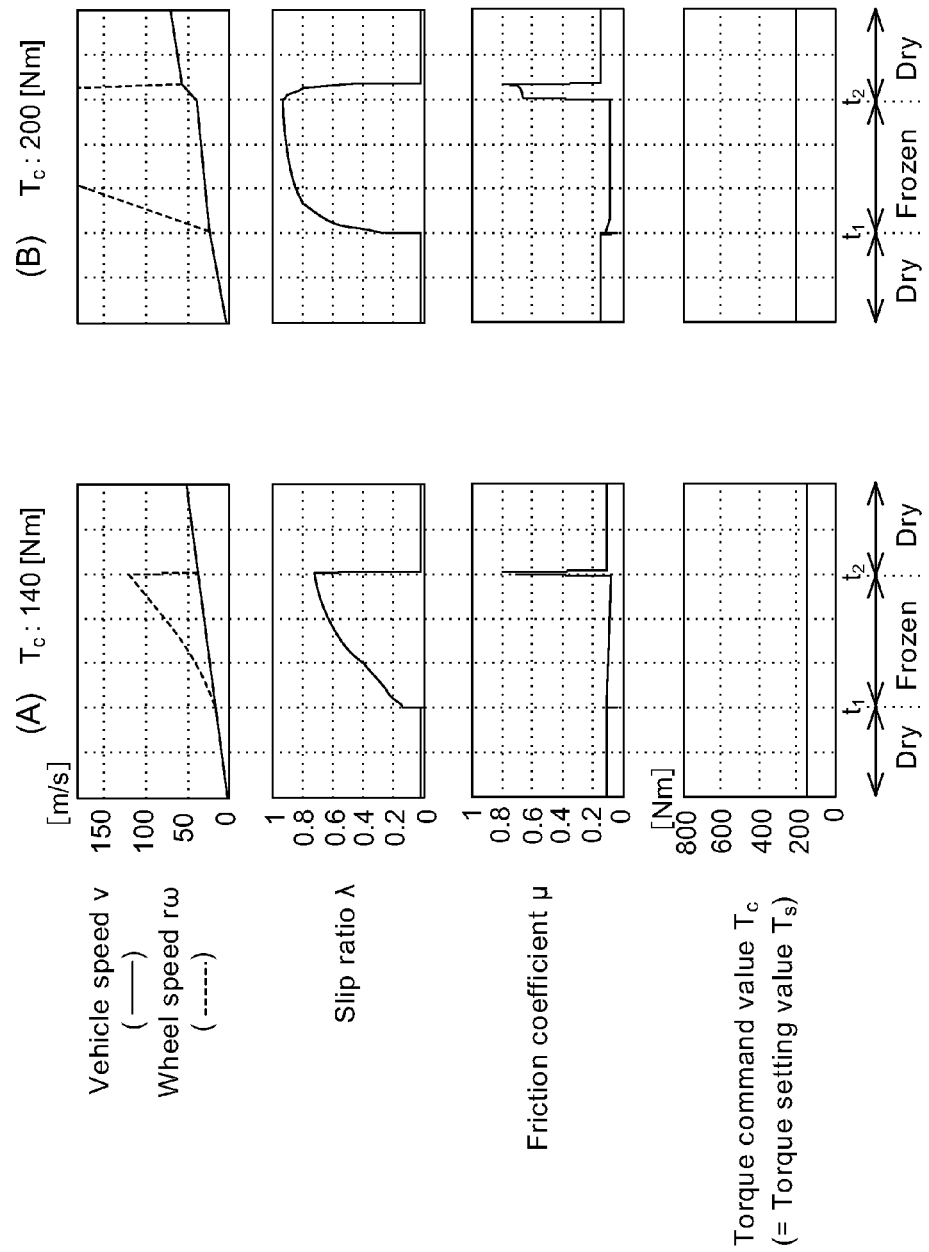
FIG. 5 is the second figure showing results of simulation when traction control is not being performed.

Note that in FIGS. 14 through 17 (and the same holds for FIGS. 18, 19, and 22 which will be described hereinafter), the results of simulation of the calculated limit value L, the estimated driving torque $T_d$, and the torque setting value $T_s$ are shown as the simulation results when limitation control is not being performed, in addition to the speed of the vehicle v, the wheel speed (rω), the slip ratio λ, and the friction coefficient μ shown in FIGS. 4 and 5. Here, the limit value L that has been calculated (termed the "calculated limit value L" in FIGS. 14 through 9 and 22), the driving torque $T_d$ that has been estimated (termed the "estimated driving torque value $T_D$") and the torque setting value $T_s$ are shown in the figures in this way, for easy comparison with the torque command value $T_c$.

As shown overall by FIGS. 14 and 15, on a dry road surface the torque setting value $T_s$ is not limited, because the limit value is greater than the torque command value $T_c$. However, when the vehicle progresses onto a frozen road surface, since the limit value L decreases below the torque setting value $T_s$, accordingly the torque setting value $T_s$ instantaneously becomes limited by the limit value L. As a result, it is verified to suppress increase in the slip ratio λ. In other words, it is verified for traveling upon a dry road surface with sufficient acceleration and traveling upon a frozen road surface with prevention of slippage to be compatible.

Moreover, as shown overall by FIGS. 16 and 17, on a dry road surface the torque setting value $T_s$ is not limited, because the limit value is greater than the torque command value $T_c$. However, when the vehicle progresses onto a frozen road surface, since the limit value L decreases below the torque setting value $T_s$, accordingly the torque setting value $T_s$ instantaneously becomes limited by the limit value L. As a result, it is verified to suppress increase in the slip ratio λ. In other words, it is verified for traveling upon a dry road surface with sufficient deceleration and speed limitation upon a frozen road surface with prevention of slippage to be compatible.

As has been explained above, in this example, the control unit 110 acquires the speed of the vehicle CR equipped with the driving wheels that are driven by the motors 930$_j$, the rotational speeds of the driving wheels of the vehicle CR, and the actual torque values that are generated by the motors 930$_j$. Here, it may acquire the vehicle speed, the rotational speeds, and the actual torque values quickly.

Subsequently, on the basis of the vehicle speed and the rotational speeds, the control unit 110 estimates the slip ratios of the driving wheels by using Equation (5) with which quick calculations are possible. Moreover, on the basis of the rotational speeds and the actual torque values, the control unit 110 estimates the driving torques of the driving wheels by using Equation (6) with which quick calculations are possible.

Next, on the basis of the slip ratios and the driving torques, the control unit 110 calculates the limit values L for the torque command values using Equation (11) with which quick calculations are possible. And the control unit 110 performs limitation processing for the torque command values on the basis of the limit values and generates torque setting values, and sends these torque setting values that have thus been generated to the motor drive system.

Thus, according to this example embodiment, it enables to implement control for performing stable traveling while ensuring the required drive power rapidly according to changes of the state of the road surface.

Moreover, in this example, the minimal value among the limit values that have been calculated for each of the plurality of driving wheels is taken as being the limit value for all of the torque command values for the plurality of driving wheels. In this case, it is possible to ensure stable traveling, since it is possible to suppress the differences in the torque setting values between the plurality of driving wheels. For example, if the vehicle is traveling along a road surface of which the left side only is frozen, the limit value that has been calculated by taking the left side driving wheel as a subject is also utilized for the right side driving wheel; accordingly it is possible to prevent unbalance of the torques to left and right, and thereby preventing change of the orientation of the vehicle body.

[Modification of the Example]

The present invention is not to be considered as being limited to the example described above; alterations of various types are possible.

For example, in the example, it was arranged for the control unit 110 to calculate the limit value according to Equation (11) above. By contrast, it would also be possible to calculate and store the value within parentheses on the right side of Equation (11) in advance for various values of the slip ratio, and to register a reference table in the storage unit 120 giving the correspondence between the slip ratios and the results of that calculation. And it could then be arranged for the control unit 110 to calculate the limit value by multiplying a value that has been read out from this reference table on the basis of the estimated slip ratio, by the driving torque.

Furthermore while, in the example, it was arranged to utilize an acceleration sensor when acquiring the vehicle speed, it would also be acceptable to arrange to utilize some other sensor, such as an optical type ground sensor.

Yet further, as explained with reference to FIG. 11, control is performed so that the d axis detected current value $I_{d,j}$ and the q axis detected current value $I_{q,j}$ become the same, respectively, as the d axis current command value $I_{d,j}{}^*$ and the q axis current command value $I_{q,j}{}^*$. Accordingly, while there is some delay in the response time due to the PI calculation and the motor characteristics, as a result the actual torque value $T_m$ is controlled to become the same as the torque value $T_s$. Due to this, while in the example the actual torque value $T_m$ of the motor was obtained from Equation (1), it would also be acceptable to arrange to calculate the actual torque value $T_m$ by multiplying the torque response characteristic by $T_s$, according to the following Equation (12):

$$T_m = T_s \cdot (1/(\tau_1 \cdot s + 1)) \qquad (12)$$

Here, the value $\tau_1$ is the time constant for torque response.

Moreover, in the example, it was arranged to calculate the limit value for the torque command value by using Equation (11). By contrast, it would also be acceptable to arrange to calculate the limit value by using some other equation. Modified examples for calculation of the limit value will now be described.

<The First Modified Example of the Limit Value Calculation>

As in the case of an onboard type electric automobile, one or more mechanical components interposed from the motor to the driving wheels make the torque response generated at the driving wheels slow compared with those of an in-wheel type electric automobile. For example, if the torque response time is 50 [ms], then a delay occurs in the estimation of the driving torque $T_d$ to lead a delay also in the calculation of the limit value L. As a result, if Equation (7) described above is employed just as is, then a delay also occurs in the torque limitation process, as compared to the case when the torque response time is 5 [ms]. As a result, the level of suppression of increase in the slip ratio λ is reduced, as will be understood from comparison of the simulation results shown in FIG. 18(A) (the torque response time: 5 [ms]) and those shown in FIG. 18(B) (the torque response time: 50 [ms]).

Due to this, for example, if the limiter coefficient k is reduced from "0.01" to "0.003", it strengthens the torque limitation to suppress increase in the slip ratio λ. However, torque limitation is applied even in the region where the slip ratio is small, and, is applied to the torque setting value $T_s$ when the vehicle returns to a dry road surface, as will be understood from the simulation results shown in FIG. 19(A).

Thus, it would also be possible, in order to perform strong torque limitation when the slip ratio λ is large while weakening the torque limitation when the slip ratio λ is small, to arrange to perform the calculation of the limit value L according to the following Equation (13), which is a reformulation of Equation (8) described above:

$$L = T_d \cdot (b + k_{11} \lambda^2) \tag{13}$$

The simulation results when, in Equation (13), the constant b is "1" and the limiter coefficient $k_{11}$ is "0.001" are shown in FIG. 19(B). As will be understood from FIG. 19(B), although the slip ratio λ temporarily increases when the vehicle passes onto a frozen road surface, along with the passage of time the system operates so that the slip ratio λ is reduced. Furthermore, when the vehicle returns to the dry road surface, unnecessary reduction of the torque setting value $T_s$ also does not occur.

Figure 18:
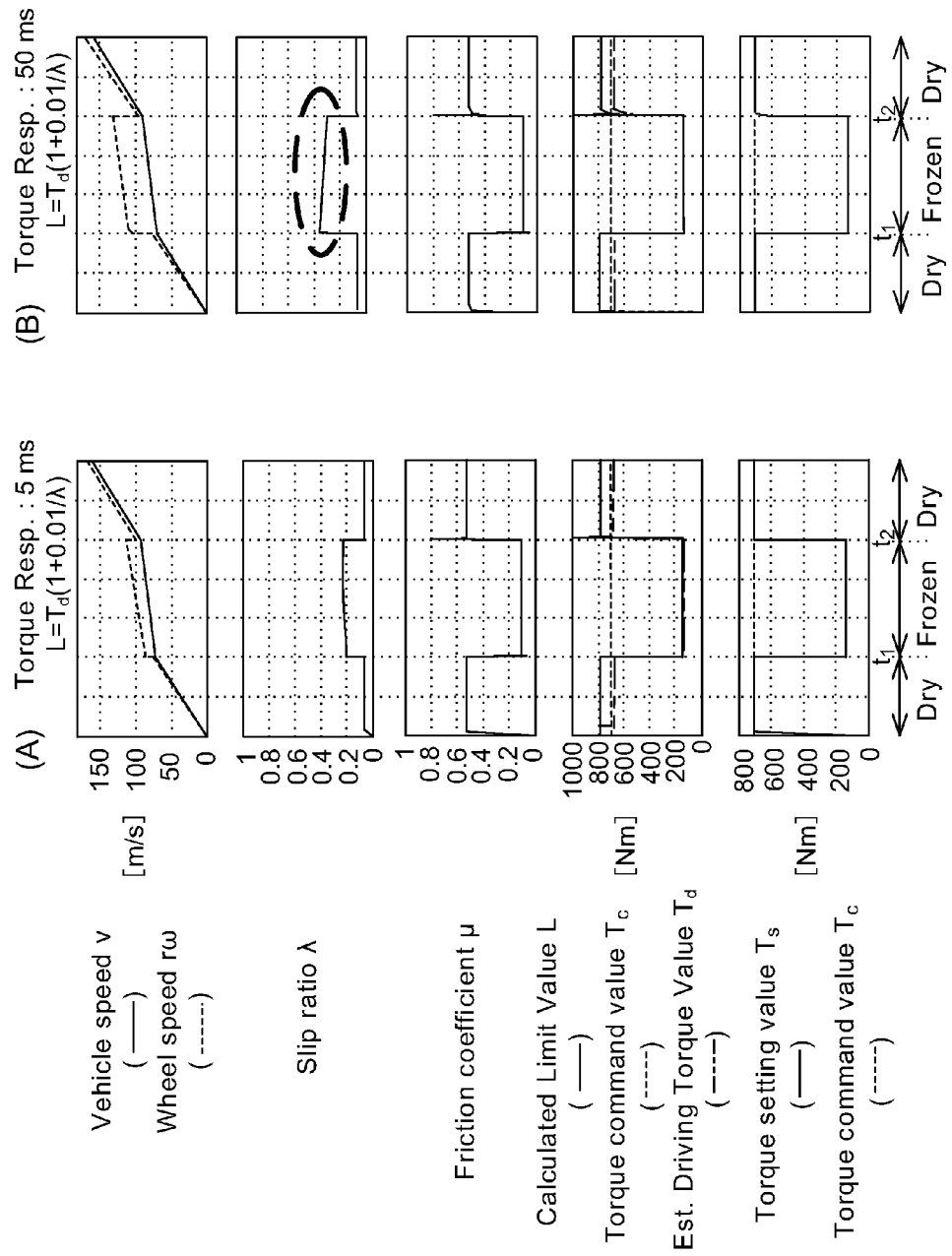
FIG. 18 is the first figure showing results of simulation during traction control by the first modified example of limit value calculation, along with a comparison example.
Figure 19:
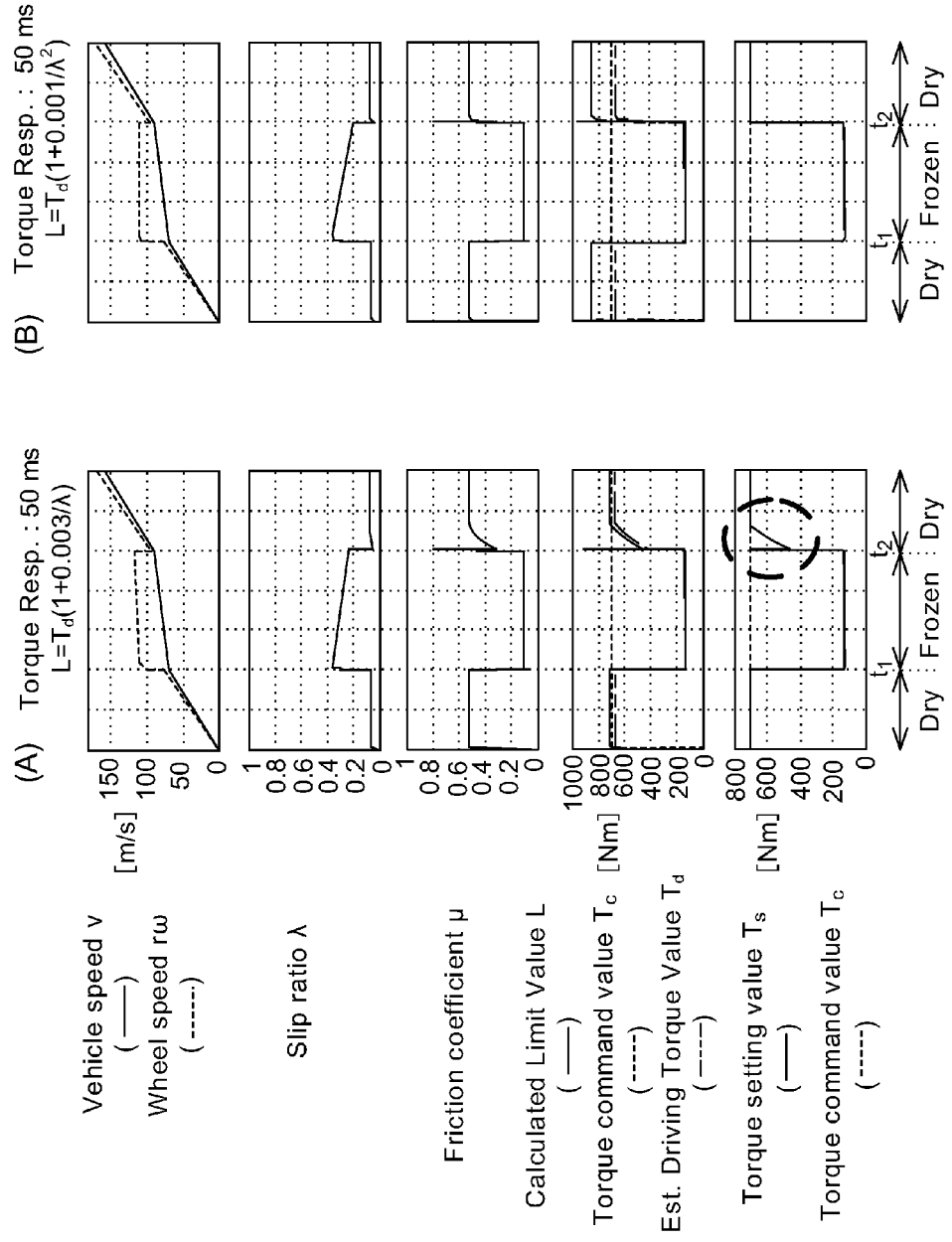
FIG. 19 is the second figure showing results of simulation during traction control by the first modified example of limit value calculation, along with a comparison example.

Note that, except for the torque response time specified above, the conditions for the simulations providing the results shown in FIGS. 18 and 19 are the same as in the case of the simulation that provided the results shown in FIG. 15(B) and described above.

Figure 20:
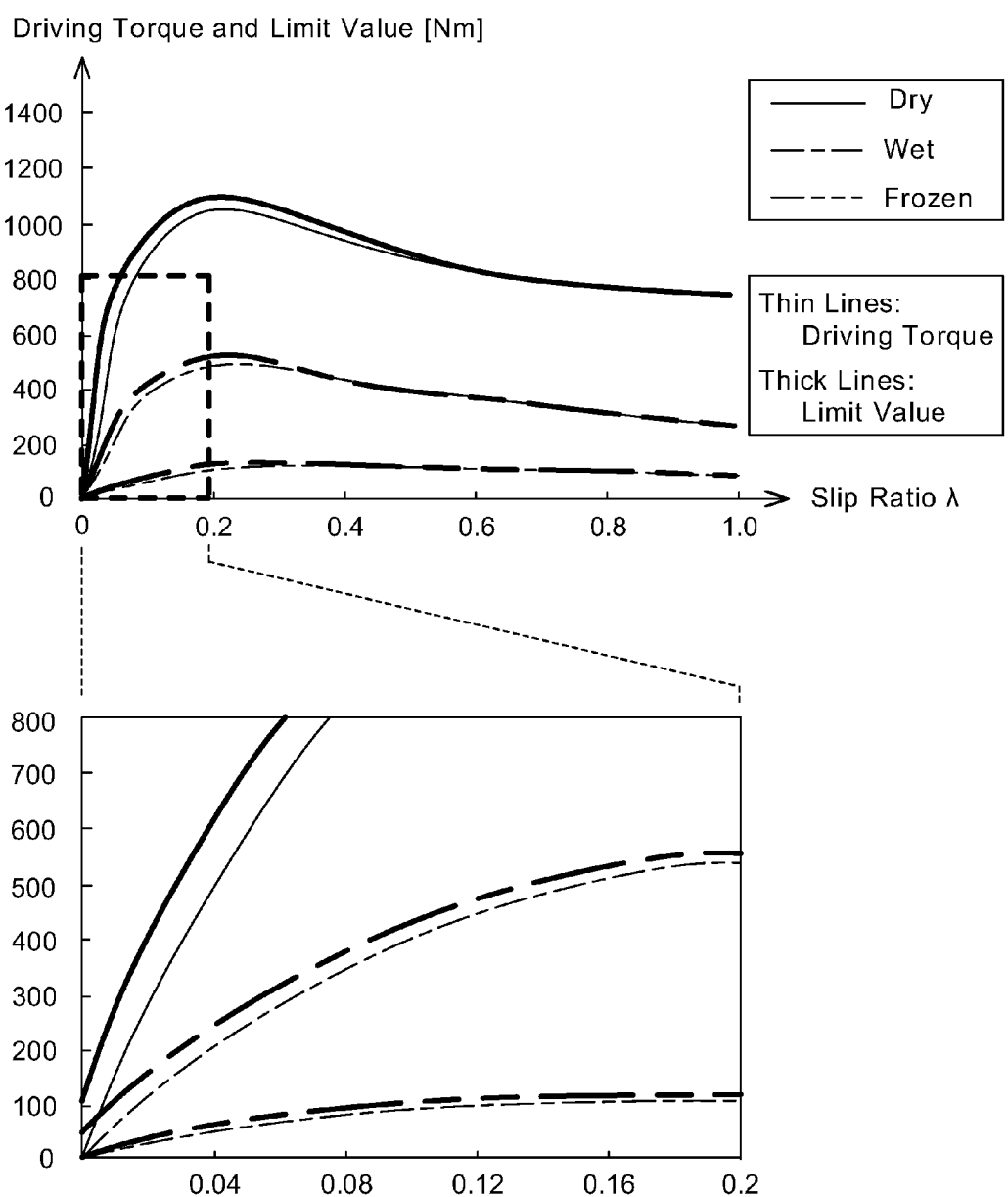
FIG. 20 is the first figure for explanation of the effectiveness of the first modified example of limit value calculation.
Figure 21:
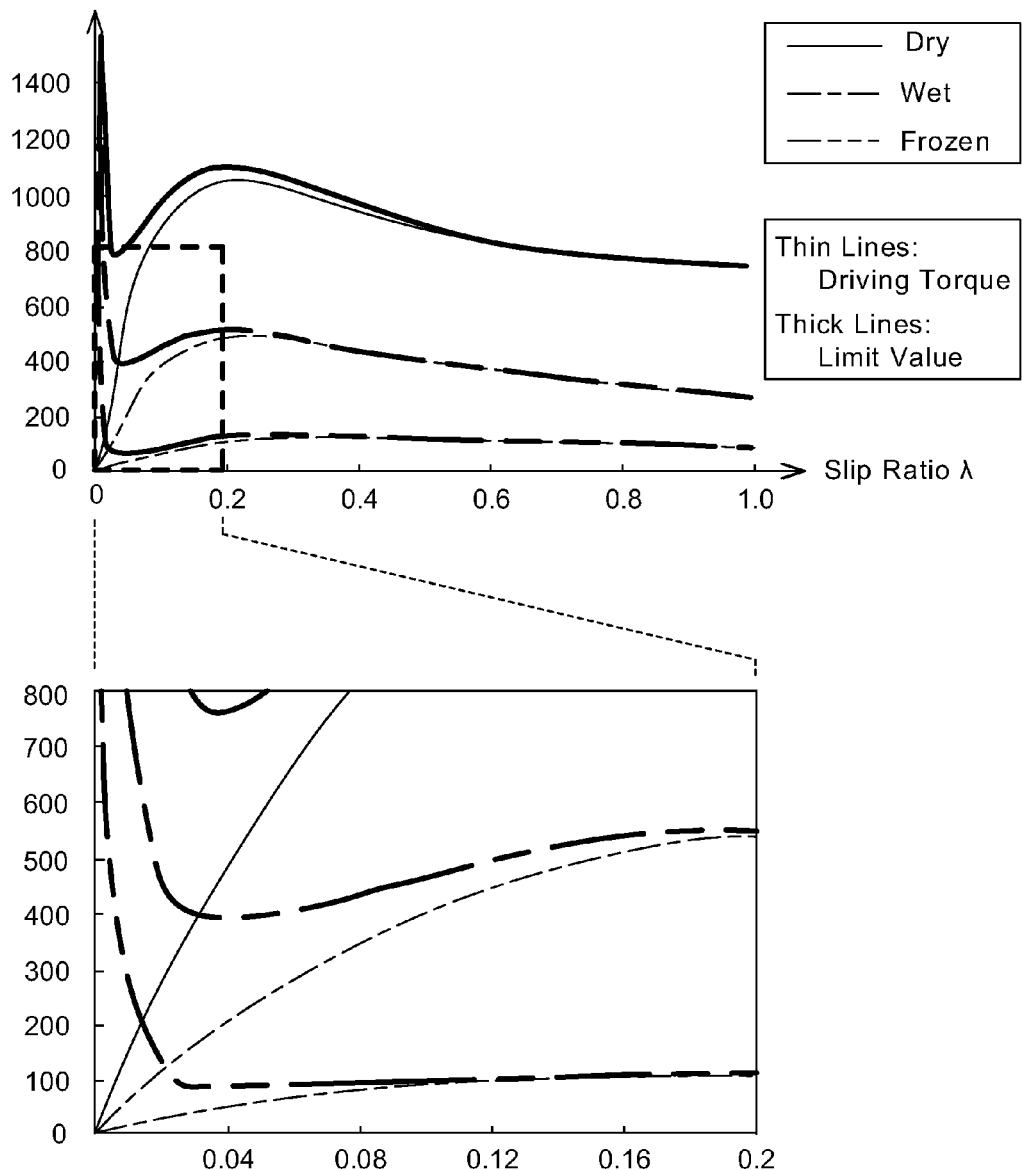
FIG. 21 is the second figure for explanation of the effectiveness of the first modified example of limit value calculation.

The reasons for the effectiveness of the limit value calculation according to Equation (13) will now be explained with reference to FIGS. 20 and 21. Here, the relationship between the limit value L calculated according to Equation (7) and the driving torque $T_d$ when the torque response time is 50 [ms] is shown in FIG. 20. Moreover, the relationship between the limit value L calculated according to Equation (13) and the driving torque $T_d$ when the torque response time is 50 [ms] is shown in FIG. 21.

When the limit value L calculated with Equation (7) is used, as shown in FIG. 20, comparatively strong torque limitation is performed even when the slip ratio λ is less than "0.2". By contrast, when the limit value L calculated with Equation (13) is used, in the region in which the slip ratio λ is less than "0.2", as compared to the case of FIG. 20, the reduction in the limit value L is not large, and only weak torque limitation is performed. This is because with Equation (13), since the limiter coefficient $k_{11}$ is divided by $\lambda^2$, when the slip ratio λ becomes small, the value $(k_{11}/\lambda^2)$ abruptly becomes greater than the value $(k/\lambda)$. Accordingly, even though the limitation becomes strong when the limiter coefficient $k_{11}$ is small and the slip ratio λ is large, still it is possible to prevent unnecessary torque limitation when the slip ratio λ becomes small.

With a similar idea in mind, it would also be acceptable to arrange to divide the limiter coefficient by $\lambda^3$.

Note that Equation (13) is not to be considered as being limited to a case in which the torque response is slow, as with an onboard type electric automobile MV; it could also be used even in a case in which the torque response is quick. In other words, it would be possible to apply Equation (13) whatever the response time period is, by setting the value of the limiter coefficient $k_{11}$ appropriately according to the torque response period of the driving wheels.

<The Second Modified Example of the Limit Value Calculation>

With the results when Equation (13) described above is employed, the slip ratio temporarily increases at the instant that the vehicle travels onto a frozen road surface. After such increase, in order to reduce the slip ratio λ as rapidly as possible, it would also be acceptable to arrange to calculate the limit value L according to the following Equation (14), which is the above Equation (9) rewritten.

$$L = T_d \cdot \{(c + k_{21}/\lambda^2 - k_{22} \cdot (d\lambda/dt)\} \tag{14}$$

The simulation results when, in Equation (14), the constant c is "1", the limiter coefficient $k_{21}$ is "0.001", and the limiter coefficient $k_{22}$ is "1" are shown in FIG. 22(C). Note that, for the purposes of comparison of the beneficial effects of the second modified example, the simulation results of FIG. 15(B) for the example are rewritten in FIG. 22(A), and also the simulation results shown in FIG. 19(B) for the first modified example of the limit value calculation are rewritten in FIG. 22(B).

In the case shown in FIG. 22(C), as compared to the case of FIG. 22(B), it is possible slightly to suppress the abrupt increase in the slip ratio λ at the instant that the vehicle moves onto the frozen road surface. And furthermore, thereafter, the reduction of the slip ratio λ upon the frozen road surface is also performed rapidly.

Note that, except for the torque response time specified above, the conditions for the simulation providing the results shown in FIG. 22 are the same as in the case of the simulations that provided the results shown in FIGS. 18 and 19 described above.

The invention claimed is:

1. A traction control device for a moving body having a driving wheel that is driven by a motor, the traction control device comprising:
    a movement speed acquisition part acquiring a movement speed of said moving body;
    a rotational speed acquisition part acquiring a rotational speed of said driving wheel;
    an actual torque value acquisition part acquiring an actual torque value generated by said motor; and
    a control part performing limitation control of an operation of said motor, wherein
    said control part comprises:
        a slip ratio estimation part estimating the slip ratio of said driving wheel on the basis of said movement speed and said rotational speed;
        a driving torque estimation part estimating the driving torque of said driving wheel on the basis of a value that is obtained by subtracting a value that is the product of the value of the differential coefficient of said rotational speed and the value of the moment of inertia of said driving wheel, from said actual torque value;
        a limit value calculation part calculating a limit value for the torque setting value on the basis of said estimated slip ratio and said estimated driving torque; and
        a limiter part limiting the torque setting value on the basis of said calculated limit value, and
    said limit value calculation part calculates the limit value so that, the smaller the estimated slip ratio is, the larger difference from the estimated driving torque becomes, and the larger the estimated slip ratio is, the smaller difference from the estimated driving torque becomes.

2. The traction control device according to claim 1, wherein
said limit value calculation part calculates the limit value by multiplying the estimated driving torque by a value corresponding to the estimated slip ratio.

3. The traction control device according to claim 1, wherein
said limit value calculation part calculates said limit value L according to equation (I) below, using said estimated driving torque $T_d$, said estimated slip ratio $\lambda$, and a constant a and a limiter coefficient k, the constant a and the limiter coefficient k having been determined in advance:

$$L = T_d \cdot (a + k/\lambda) \qquad (I).$$

4. The traction control device according to claim 1, wherein
said limit value calculation part calculates said limit value L according to equation (II) below, using said estimated driving torque $T_d$, said estimated slip ratio $\lambda$, and a constant b and a limiter coefficient $k_{11}$, the constant b and the limiter coefficient $k_{11}$ having been determined in advance:

$$L = T_d * (b + k_{11}/\lambda^2) \qquad (II).$$

5. The traction control device according to claim 1, wherein
said limit value calculation part calculates said limit value L according to equation (III) below, using said estimated driving torque $T_d$, said estimated slip ratio $\lambda$, a constant c and limiter coefficients $k_{21}$ and $k_{22}$, and the rate of change with time $(d\lambda/dt)$ of said estimated slip ratio $\lambda$, the constant c and the limiter coefficients $k_{21}$ and $k_{22}$ having been determined in advance:

$$L = T_d \cdot \{(c + k_{21}/\lambda^2 - k_{22} \cdot (d\lambda/dt)\} \qquad (III).$$

6. The traction control device according to claim 1, wherein
the number of said driving wheels is plural; and
said limiter part calculates a torque setting value for all of said plurality of driving wheels on the basis of the minimum value of limit values that have been calculated for each of said plurality of driving wheels.

7. A traction control method that is used by a traction control device for a moving body having a driving wheel that is driven by a motor, comprising the steps of:
acquiring a movement speed of said moving body, a rotational speed of said driving wheel, and an actual torque value generated by said motor; and
performing limitation control of an operation of said motor, wherein
said performing limitation control step comprises:
estimating the slip ratio of said driving wheel on the basis of said movement speed and said rotational speed;
estimating the driving torque of said driving wheel on the basis of a value that is obtained by subtracting a value that is the product of the value of the differential coefficient of said rotational speed and the value of the moment of inertia of said driving wheel, from said actual torque value;
calculating a limit value for the torque setting value on the basis of said estimated slip ratio and said estimated driving torque; and
limiting the torque setting value on the basis of said calculated limit value, and
in calculating the limit value step, said limit value calculation part calculates the limit value so that, the smaller the estimated slip ratio is, the larger difference from the estimated driving torque becomes, and the larger the estimated slip ratio is, the smaller difference from the estimated driving torque becomes.

8. A recording medium, wherein a non-transient computer readable medium having recorded therein a traction control program that, when executed, causes a calculation part to execute the traction control method according claim 7.

* * * * *